United States Patent
Fink et al.

(10) Patent No.: US 8,924,142 B2
(45) Date of Patent: Dec. 30, 2014

(54) SYSTEM AND METHOD OF REPRESENTING ROUTE INFORMATION

(75) Inventors: Daniel Edward Fink, Berkeley, CA (US); Alastair Gourlay, Boulder Creek, CA (US); Roger James Petersen, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 348 days.

(21) Appl. No.: 12/861,287

(22) Filed: Aug. 23, 2010

(65) Prior Publication Data

US 2011/0208417 A1     Aug. 25, 2011

Related U.S. Application Data

(60) Provisional application No. 61/290,571, filed on Dec. 29, 2009.

(51) Int. Cl.
| | | |
|---|---|---|
| *G01C 21/00* | (2006.01) | |
| *G08G 1/0968* | (2006.01) | |
| *G01C 21/36* | (2006.01) | |
| *G08G 1/0969* | (2006.01) | |

(52) U.S. Cl.
CPC ...... *G01C 21/3676* (2013.01); *G08G 1/096883* (2013.01); *G08G 1/096838* (2013.01); *G08G 1/096827* (2013.01); *G08G 1/0969* (2013.01)
USPC .......... 701/408; 701/410; 701/411; 701/414; 701/433; 340/995.13; 340/995.19; 340/988; 340/990; 340/995.1

(58) Field of Classification Search
CPC .... G08G 1/0969; B60Q 1/50; B60Q 2400/50; B60Q 1/48; B60Q 5/005; G01C 21/365; G01C 21/3685
USPC .............. 701/533, 433, 532, 414; 340/995.13
See application file for complete search history.

(56) References Cited

U.S. PATENT DOCUMENTS

| | | | |
|---|---|---|---|
| 5,220,507 A | | 6/1993 | Kirson |
| 5,908,464 A | * | 6/1999 | Kishigami et al. ............ 701/454 |

(Continued)

FOREIGN PATENT DOCUMENTS

| | | |
|---|---|---|
| EP | 0660289 A1 | 6/1995 |
| EP | 0953825 A2 | 11/1999 |

(Continued)

OTHER PUBLICATIONS

Office Action mailed Apr. 15, 2013, in corresponding Canadian patent application No. 2,725,283.

(Continued)

*Primary Examiner* — Redhwan K Mawari
(74) *Attorney, Agent, or Firm* — Novak Druce Connolly Bove + Quigg LLP

(57) ABSTRACT

A route comprises interconnected road segments that can be traveled to get from a location to a destination. Previously, routes are represented by display of the spatial arrangement of such road segments (e.g., a map). Here, a route is depicted as a linear shape, and portions of the linear shape represent portions of the route, regardless of their spatial arrangement. A scale is applied between a characteristic of the route and the linear shape. Information elements can be depicted at points on the linear shape that correspond, based on the scale, to locations on the route where such information applies. Portions of the linear shape can be colored or cross-hatched according to traffic congestion conditions. Incident reports can be represented by indicators along the linear shape. Alternate routes (detours) can be represented by respective separate linear shapes; lead lines can connect such linear shapes to points of the route linear shape where each such detour would be taken.

25 Claims, 15 Drawing Sheets

(56) References Cited

U.S. PATENT DOCUMENTS

| | | | |
|---|---|---|---|
| 6,493,602 B1* | 12/2002 | Kranitzky et al. | 700/180 |
| 7,483,788 B2* | 1/2009 | Tomita et al. | 701/414 |
| 2001/0012981 A1* | 8/2001 | Yamashita et al. | 701/211 |
| 2002/0165668 A1* | 11/2002 | Yamashita et al. | 701/211 |
| 2005/0222756 A1 | 10/2005 | Davis | |
| 2006/0009908 A1* | 1/2006 | Tomita et al. | 701/210 |
| 2007/0225902 A1* | 9/2007 | Gretton et al. | 701/202 |
| 2008/0125963 A1* | 5/2008 | Shimizu | 701/201 |
| 2008/0312819 A1* | 12/2008 | Banerjee | 701/202 |
| 2009/0037093 A1 | 2/2009 | Kurihara et al. | |
| 2011/0208417 A1* | 8/2011 | Fink et al. | 701/200 |

FOREIGN PATENT DOCUMENTS

| | | |
|---|---|---|
| EP | 1577642 A1 | 9/2005 |
| EP | 2023085 A2 | 2/2009 |

OTHER PUBLICATIONS

Extended European Search report mailed Jul. 1, 2013, in corresponding European patent application No. 10173706.2.

Office Action mailed Jun. 4, 2014; in corresponding Canadian patent application No. 2,725,283.

* cited by examiner

SYSTEM AND METHOD OF REPRESENTING ROUTE INFORMATION

CROSS-REFERENCE TO RELATED APPLICATIONS

This application claims priority to U.S. provisional application No. 61/290,571, filed Dec. 29, 2009. U.S. provisional application No. 61/290,571 is fully incorporated by reference herein in its entirety.

BACKGROUND

1. Technical Field

The following relates generally to location based services (LBS) for mobile devices, and in particular to systems and methods for providing navigation information, routes, ETA information, search functionality, and other related functionality on mobile devices.

2. Related Art

Rush hour traffic volume, road construction, vehicular collisions, and roadside emergencies are just a few examples of the various events and circumstances that can cause traffic congestion. Due to the nature of such events traffic congestion can be difficult to predict. Although radio, television, and online news sources can provide traffic information gathered using various techniques such as highway cameras, phone-in traffic tips, satellite imagery, and road sensors; this information is stale and/or inaccurate.

Old or inaccurate traffic information can be troublesome for various reasons. For example, an alternate traffic route, which may be less convenient, is chosen due to a traffic report indicating that a traffic problem exists, which problem has since been alleviated. This can cause a commuter to take a less optimal route, which can waste fuel, cause them to be late, and cause congestion on side-roads. Conversely, a traffic report may indicate that the commuter's route is clear, when in fact an event has, in the meantime, created a traffic jam, since the traffic report is based on information that is not current.

In addition to better data gathering and dissemination about traffic conditions, a variety of applications and enhancements to user interfaces, such as user interfaces that are optimized for mobile devices remain to be realized.

BRIEF DESCRIPTION OF THE DRAWINGS

Embodiments will now be described by way of example, and not limitation, with reference to the appended drawings wherein.

DETAILED DESCRIPTION

Figure 1:
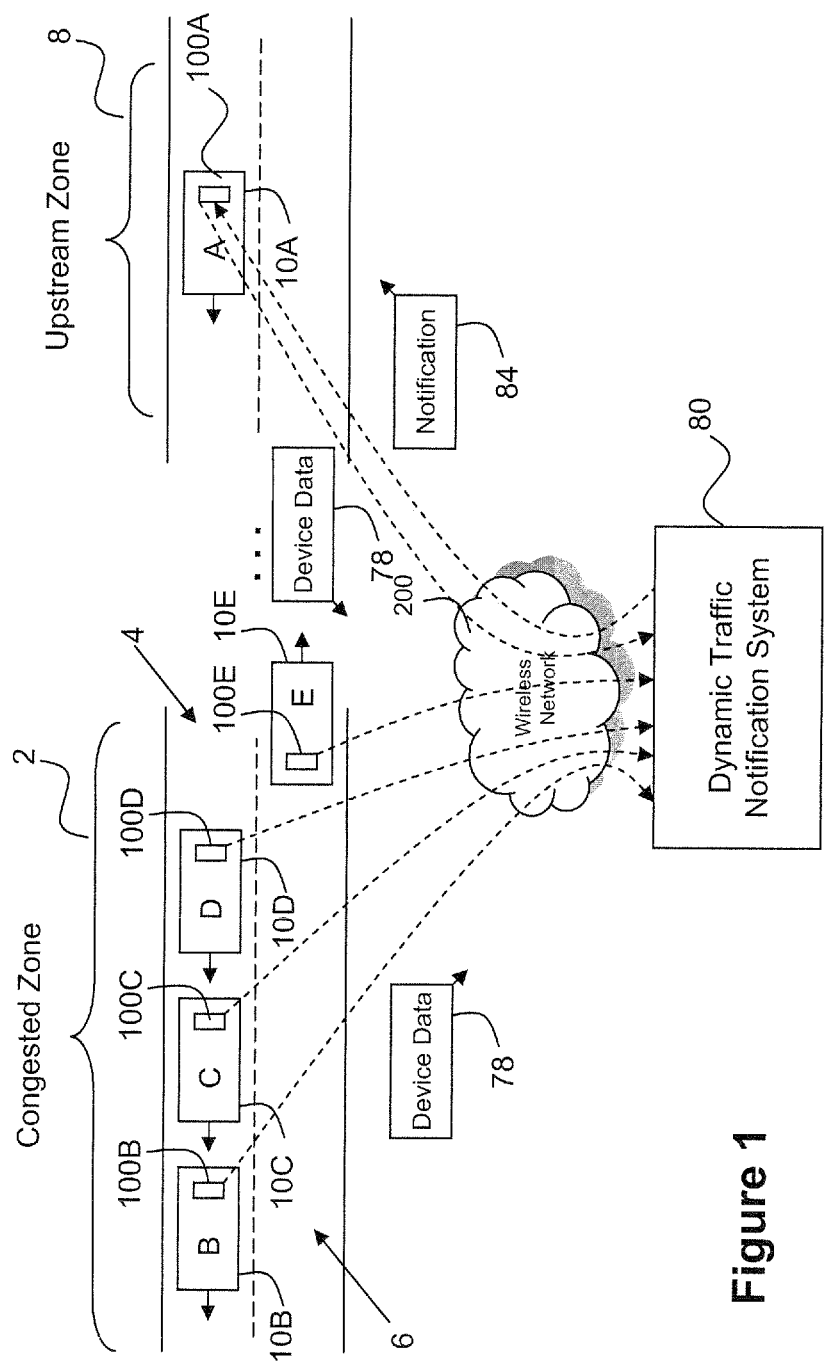
FIG. 1 depicts a schematic diagram illustrating an example of a traffic notification system providing a traffic notification to one mobile device according to data obtained from a plurality of other mobile devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The following table of contents provides a guide to the disclosure, and is organized into sections. First, component technologies and techniques are described, followed by an example architecture in which such component technologies and techniques can be employed, and finally, disclosure of several applications that can be provided in such an architecture, and which can be based on the component technologies and techniques is provided.

Introduction

The following disclosure relates to a number of topics, as outlined below and addressed in further detail in sections with corresponding headings:

I. Route Representation: Technology for Representation of Routes can be used in Navigation Supports Navigation Applications and Other Applications.

II. Traffic and Congestion Technology can be used for Modeling of Traffic Patterns and Congestion, and can Build on Technology for Route Representation and Support Various Applications, such those Described Herein.

III. Building and Using a Traffic Congestion Model.
  (a) Interval Based Analysis: One approach to traffic and congestion modelling includes dividing routes into intervals and collecting data on those intervals.
  (b) Historical Model: Traffic and congestion modeling can be based wholly or in part on collection of data and analysis of data. A historical model can be used to refine static speeds assigned based on speed limits and other sources, such as from in-road sensors.
  (c) Personalization of Travel Time Estimates.
  (d) Real Time Traffic Data.
    (i) Critical Mass for Real-Time Traffic Data.
IV. Applications
  (a) Estimation of Travel Time with a Historical Traffic Model.
  (b) Estimating Travel Time with Live Traffic Information.
  (c) User Interfaces and Techniques for Presenting Traffic and Route Information in a User-Friendly Format.
V. Example Architectures
  (a) Example System Architecture.
    (i) Message Router/Relay Server.
    (ii) Example Mobile Device Architecture.
    (iii) Notification Sub-System.
VI. Notifications.
  (i) Location-Dependent Notifications.
  (ii) Determining to Send a Notification.
  (iii) Condition Monitoring.
  (iv) Variable Thresholds for Congestion Notification.
VII. An Example Approach to User Interfaces and Techniques for Presenting Traffic and Route Information in a User-Friendly Format.
VIII. Search Interface and Results Display.
I. Route Representation: Technology for Representation of Routes can be used in Navigation Supports Navigation Applications and Other Applications.

An object for vehicle navigation is providing a route from an origin to a destination. The route can be roughly defined to include an ordered sequence of roadways that may be traveled to move from the origin to the destination. In general, there will be many (perhaps millions of) possible sequences that may be used to travel between any given origin/destination pair. In practice, there are a relatively small number that are "good" (as defined by some measure or measures, such as shortest, fastest, and more subjective measures such as simplest, least stress, most scenic, and so on). Given a set of conditions, there often can be determined an optimal (best) route to fit a given measure or measures.

For computer-assisted vehicle navigation, a route can be defined relative to a map database. A map database generally comprises an object-based encoding of the geometry, connectivity and descriptive attributes of a collection of roadways, and is usually based on a topological model, such as a 1D directed graph inscribed within a 2D surface sheet. The individual objects in a model of this type include edges that mostly represent roads (such as the centerlines of roads), and nodes that represent locations where roads intersect and cul-de-sacs terminate. A "road" or "roadway" (used interchangeably here) in a map database can be defined in terms of a connected "chain" of edges that share a common name. Most roadways consist of a single connected chain. Some roads are more complicated, for instance, a road may be split in two by another geographic feature such as a river.

Certain non-road features can also be represented by edges, including railroads, streams and rivers, and the boundaries of area objects (faces) such as parks, water bodies, and military bases, as well as boundaries of towns, cities, counties and similar divisions of governmental hierarchy.

The geometry of the database can be represented by coordinate locations (x/y or longitude/latitude points) associated with nodes, and "shape" (often point sequences) associated with edges. The "raw" connectivity of the roadways is represented by the edge/node connectivity that is provided by the directed graph representation: each edge has a specific "from" and "to" node; each node has a list of edges that have the node at either the "from" or "to" end.

Actual road connectivity may be limited by descriptive attributes such as turn prohibitions and travel mode restrictions. Other descriptive attributes can include the road name, legal travel speed and direction (bi-directional or one-way), number of lanes and similar.

Map databases can carry different levels of detail. A fully detailed, or large-scale map database will include everything from the most important long-distance highways to minor back alleys and un-paved country lanes. A sparsely detailed, or small-scale map database can have only the most important highways and connections that allow long distance travel.

Map databases also include varying geographical extents of coverage. Some map databases may cover only a small area. Others may cover entire continents. Often there is an inverse correlation between scale and coverage extent, in that large-scale maps tend to have limited geographic coverage, while continental extent maps may have limited detail. Such a circumstance was particularly true for paper maps (city map vs. road atlas), and is still true in paper-equivalent computer map renderings. A familiar example is the internet-based mapping service: when zooming in on a given displayed map area, more detail and less extent are displayed, and when zooming out, less detail and more extent are displayed.

In fully detailed databases, wide roads and roads with wide medians may also be split lengthwise into two separate one-way chains representing the two independent directions of travel. Many roads are short, consisting of only a single edge. Some roads are very long, spanning from ocean to ocean across a continent, and consisting of thousands of individual edges within a full-detailed representation. Most roads are somewhere between these two extremes.

A route as originally described may therefore be represented as a specific sequence of connected edges within a map database. Given a route with this representation, a variety of properties about the overall route can be determined by inspecting the individual edges. For instance, to determine the length of the route, one can sum the lengths of the individual edges. Similarly, to estimate travel time of a route, one can determine the travel time for each edge (length divided by speed) and accumulate the sum over the whole set. Such a travel time is termed "static", in that it would be based on a fixed representation of speed.

More elaborate results may be determined by examining a route's edge sequence within the context of the containing database. For instance, the list of turn-by-turn instructions that are required to follow a route may be inferred by examining how the route traverses each node relative to the other edges that occur at the corresponding intersection. Some intersection traversals are more important than others, and may warrant explicit identification in a route representation. Other intersections are more trivial; for example, those in which no turn is made. Such intersections may not be explicitly identified in some representations.

II. Traffic and Congestion Technology can be used for Modeling of Traffic Patterns and Congestion, and can Build on Technology for Route Representation and Support Various Applications, such those Described Herein.

Turning now to FIG. 1, an example zone of traffic is shown, which comprises a traffic "problem" hereinafter named a congested zone 2. The congested zone 2 comprises a "left-bound" lane of traffic 4 (i.e. with respect to the page) and a "right-bound" lane of traffic 6. It can be seen that the congested zone 2 represents a common zone of traffic congestion caused by any one or more traffic events. Another zone of traffic is also shown in FIG. 1 and, in this example, represents an upstream zone 8, which refers to any roadway that is, approaching, expected to connect, lead into, or is simply an upstream portion of a same roadway that includes the congested zone 2. In this example, the upstream zone 8 thus feeds traffic into the congested zone 2 such that at least one mobile device 100 approaching the congested zone 2 can be determined.

In the example shown in FIG. 1, the congested zone 2 at a particular point in time comprises three vehicles travelling left-bound 4, namely vehicles 10B, 10C, and 10D; and comprises a single vehicle 10E travelling right-bound 6. For the present discussion, the congestion occurs in the left-bound lane only whereas vehicle 10E is moving at a normal rate of speed in the right-bound lane. The upstream zone 8, at the same point in time, comprises a single vehicle 10A travelling left-bound 4 towards the congested zone 2. Each vehicle 10A-10E comprises a respective data communications device, hereinafter referred to as a mobile device 100A-100E, which travels with the corresponding vehicle 10A-10E in which it currently resides. As will be explained below, the mobile device 100 can be any suitable device capable of communicating via a wireless network 200. The mobile devices 100 utilize such capability to provide device data 78 to a dynamic traffic notification sub-system 80, via the wireless network 200. The device data 78 comprises information related to the location and speed of the vehicle 10, as measured by, or obtained by or from another source, the mobile device 10 located and travelling within the vehicle 10. For example, mobile device 100B in vehicle 10B may utilize a GPS function to measure the speed of the vehicle 10B and the current location, prepare device data 78, and send the device data 78 to the dynamic traffic notification sub-system 80, hereinafter referred to as "the notification sub-system 80" for brevity.

As will also be explained below, the notification sub-system 80 uses device data 78 from a plurality of mobile devices 100 to dynamically determine traffic conditions, such as the development of the congested zone 2, in order to prepare a notification 84 that can be sent to a mobile device 100 that is expected to be headed towards the congested zone 2.

III. Building and Using a Traffic Congestion Model.

Commute traffic congestion tends to follow very reliable patterns. For example, a given stretch of heavily used freeway at 7:30 AM every weekday morning, would be expected to have traffic moving much slower than during normal "free-flow" conditions. Within that basic model, more refined patterns can be found. For example, it can be found that traffic may be heaviest on Monday (33 mph average), a little lighter Tuesday-Thursday (37 mph) and perhaps lighter still on Friday (45 mph). However, the same stretch of freeway may be free flowing (e.g., 65 mph) at noon, flowing well during the evening commute (e.g., 60 mph), and racing along at 75+ mph overnight and on the weekend.

Further, observations for a single person traveling at the roughly the same time over the same route for five days a week, 50 weeks a year, can be accumulated to develop a robust model of the traffic congestion that this person faces each day, including its consistency, its day-of-the-week and season-of-the-year variability, and perhaps most importantly, the congestion's effect on the travel time that the person experiences daily.

Furthermore, these observations can yield information about how the congestion tends to affect certain portions of the route. For example, a portion of a route following "Hwy 1" tends to flow at 39 mph, and the portion that follows "Hwy 2" tends to flow at 51 mph. In turn, the portion of Hwy 1 between $7^{th}$ and $10^{th}$ streets can be observed to average 34 mph at around 7:44 AM, and the portion between $10^{th}$ and $14^{th}$ streets observed to average 41 mph at 7:51 AM and so on.

This description of a single person's experience can be generalized into the system concept of collecting traffic data using "traffic probe" and using that data for traffic modeling. By collecting observations or data for a large enough number of vehicles/drivers (by, for example, using wireless devices with GPS), then those observations and that data can be aggregated and collectively analyzed to develop an overall model of traffic congestion. In such a system, each device (e.g., owned by a driver of a vehicle) serves as a probe sensing the traffic conditions at particular locations and times. The overall picture serves as the traffic model, and is a byproduct of the system.

(a) Interval Based Analysis: One Approach to Traffic and Congestion Modelling Includes Dividing Routes into Intervals and Collecting Data on those Intervals.

To perform such traffic modeling and aggregation of probe data, a framework that sub-divides the highly trafficked parts of the road network into well defined "traffic segments" (e.g., Hwy 1 between $7^{th}$ and $10^{th}$) is provided. Each traffic segment can correspond to a short "chain" of edges that are in the map database. Time also can be sub-divided into intervals (e.g., 15 minute uniform slots).

For traffic and congesting modeling using a road interval-based system, each probe can travel through the network (matching the travel shape of its path to the shape of a continuous sequence of edges) and can provide its average speed through each traffic segment. Such information can be assigned to a best-fitting time bucket.

Even with a well-distributed and robust number of probes, some road segments may not be well traveled at certain times of the day (for instance, reverse commute directions); it may also be that some time periods of the day may not have see very many probes anywhere (2:00-3:00 AM). However, these "gaps" in the data collection represent locations and times when there is not much traffic to begin with (in that the absence of probes in an otherwise well-distributed probe set leads to that conclusion); therefore, such data gaps are not considered to represent a true lack of knowledge concerning traffic conditions on those road segments or at those times. Rather, such absence can itself be considered an indication of where and when traffic congestion likely will not occur, and using default static speed would suffice.

(b) Historical Model: Traffic and Congestion Modeling can be Based Wholly or in Part on Collection of Data and Analysis of Data. A Historical Model can be used to Refine Static Speeds Assigned Based on Speed Limits and Other Sources, such as from In-road Sensors.

One product of such a data collection and aggregation process is a "historical traffic model". In one example, a historical traffic model includes a list of traffic segments and associated time-of-day, day-of-week (and given enough time, week-of-year) time slots that contain expected traffic flow speeds (potentially with error estimates) during that time slot on that segment. Gaps can be filled with default "static" speeds. The model can be constructed as a large matrix, with rows representing traffic segments and columns representing time slots.

In some embodiments, it may be that only 20-25% of the edges in the map database will be "covered" by the model, because most edges are minor roads that may have little or no congestion or traffic patterns of interest, and therefore may not be of primary concern. Instead, freeways, highways, and important arteries and connecting ramps would be the primary focus of the traffic model.

One useful application of a historical model is to improve the accuracy of travel time estimation, and in one specific application, Estimation Time of Arrival (ETA) calculations or determination. ETA is an important feature provided by a vehicle navigation system. ETA is a fairly simple concept: "if I leave now and follow this route, about when will I get there?" Determining ETA is equally simple on the surface: if I know my route, and I have an estimate of how long it will take to travel the route (for example, the "static" summation described above), then I can estimate my ETA by taking the current time (or in general, the expected departure time) and merely add the travel time estimate. This technique is good as long as the travel time estimate is reliable.

However, travel time estimates can be unreliable. In fact, there are a variety of factors that can cause travel time to vary. Very long routes probably involve one or more stops (for fuel, food, sleep, etc.) that will increase travel time. Travel time is also (obviously) dependent on actual travel speed: some people drive fast, some drive slow; some times there is bad weather or unforeseen detours; sometimes there is traffic congestion that is slow, slower or even stopped all together. Accurately computing ETA in an automated vehicle navigation system is therefore problematic. Many of the influencing factors are completely beyond the insight or control of the best automated system, as they rely on human behavior (e.g., the decision to make a stop) or the unpredictable future (traffic "accidents" happen). However, if we factor out the uncontrollable, there are still many refinements that may be made to improve travel time estimation accuracy.

Historical modeling techniques also can be personalized for each user, such that particular user habits and preferences can shape data collected and how that data is used in developing a traffic model for that user.

(c) Personalization of Travel Time Estimates.

One improvement in estimation of travel times would be to tailor travel time estimates to individual driving habits and preferences. Such an approach can be explained by reference to a common scenario: the daily commute to and from work. The daily commute has many opportunities for improving travel time estimation accuracy. Much of this revolves around its predictability. The route (or handful of route choices) is usually well established. It probably does not include any stops. It is habitual. Therefore, the habits of the individual driver are easily recognized. For instance, if the "static" travel time for a habitual route is always faster or slower than the time that it takes the person to actually drive the route, then an adjustment factor can be calculated to improve the estimate for that person. Other approaches to using data pertinent to a particular individual or feedback from prior experience to improve system behaviour can be provided. For example, observing how a person drives on different types of roads may pick up similar habits: some people tend to drive fast on the freeway, some drive more slowly. This can similarly be applied to the estimate by applying personalized factors to adjust the speeds used for the different road types. If a person's habits are consistent, then these adjustment factors can be applied to any travel time estimate that is produced for that person, and not just for particular roads or road segments.

(d) Real Time Traffic Data.

Previously, it was disclosed that data collection for and observations about personal driving habits can be used to improve accuracy of the estimation of route travel time and correspondingly ETA determination, and further that historical traffic models have the potential for even greater improvement and wider application.

However, both of these methods rely on the stability of previously observed driving patterns, and some times actual traffic congestion (due to accidents, bad weather, sporting events and similar, or just wide variability) is much worse (and occasionally much better) than expected.

If the departure time for a trip is immediate, it typically is preferable to know what the "live, real time" traffic conditions are now, rather than relying solely on the historical model, at least for the first portion of the route. Such an approach should yield more accurate travel time and ETA, and can serve as a trigger to alert the driver that today's experience will be worse ("you're going to be late") or better ("you have ten extra minutes") than usual.

With the a network of probes (which can be used to produce the historical traffic model described previously), it is possible to monitor the current activity of all probes in real time to produce a current picture of traffic congestion, as will be addressed further below. For example for all traffic segments, a list of recent probe samples for each segment can be tracked and used to compute a "live expected speed" for the segment.

An approach to using these live speeds to compute travel time can be similar to the use of speeds from the historical model and can include stepping through the route's edges in sequence computing travel times for each edge. If the edge corresponds to a traffic segment for which there is a current live speed then that speed can be used. If this is no live speed, then the historical model value from the appropriate time slot can be used. If there is no traffic segment, then a static speed can be used.

In practice, a robust implementation is more complicated than this conceptual description. One reason is that live traffic has a limited "shelf life". In other words, after some amount of time (e.g., 30 minutes), it is likely that the current live speed will be invalid, and that the historical pattern speed may be more accurate.

A preferred speed determination function includes a continuous function of live and historical values. A simplified description of one such function can be: for a set time along the route (<10 minutes?) the average live speed of recent probes is used, then for some period of time (10-30 minutes?) a decreasing fraction of live combined with an increasing fraction of historical speed is used, after which historical is used exclusively.

Because conditions will change, the ETA calculation preferably is continuously updated as the route is consumed (traveled) during driving. Such preference is based on at least three reasons. First, actual traffic congestion will continue to evolve, and probes driving somewhere up ahead may detect different and new conditions, thus evolving the live model. Second, because part of the route has been consumed by driving, the location framework for live traffic has shifted, so that live information is needed for roads that are further along the route than originally needed. Third, because actual travel progress may vary greatly from the original estimate (particularly on long routes), the time framework of the historical model may also change, resulting in a dramatic increase or decrease of likely traffic speeds far ahead.

Live traffic and congestion data, such as that obtained from in-vehicle probes, can be used for modelling traffic and congestion, and can supplement a historical model. A mixture of live data and historical data can be used.

(i) Critical Mass for Real-Time Traffic Data.

A limited shelf life of traffic data also implies that the availability of live traffic data for a probe-based system depends on the existence of traffic probes. Further, such probes would best be available during potential times of congestion on routes where such congestion likely would occur. As such, a probe-based live traffic model benefits from the presence of a "critical mass" of probes driving around the corresponding road network. There are many possible ways to define critical mass. One useful definition is that, for each important traffic segment, there has been at least one probe sample collected within the last 5 minutes. In a gradual probe deployment (for instance, based on the gradual adoption of a consumer application), it is likely that the most highly trafficked roadways will achieve critical mass first, followed less highly trafficked roadway, and so on. It is also likely that some directions of some roads, and certain times of the day (or night) may not readily achieve a critical mass of live traffic probes. However, because there is a high correlation between presence of probes at locations and at times where and when there is a need for probe data, a "working" critical mass can be achieved with tractable probe penetration numbers.

A definition of critical mass can be adapted for particular users. For example, a route taken to work by a particular user may achieve critical mass on a given day, if each (potentially congested) traffic segment had at least one valid probe sample available before that user drove such segment. Thus, in a given deployment, some people will enjoy the benefits of critical mass in advance of general availability. A probe-based system also causes some probes to be "sacrificial probes" in that those problems did not get a live traffic data, and instead were caught in a given traffic problem. In other words, for some users to avoid traffic, some other user has to encounter it.

It is possible to extend the benefits of the live traffic model to other applications. For example, an application can be provided that estimates a required departure time, to arrive at a given destination at or before a given time. More particularly, the application can give updates as to changes in required departure time based on the live traffic model. For example, if a person knows of (or have calendared) a 10:30 appointment, a device, such as a digital assistant or phone, can repeatedly check an ETA, and provide an alert when the ETA is within a range of the appointment time (e.g., 5, 10, 15, or 20 minutes). If the person has experience traveling that route, then such an application can help the user leave at an appropriate time based on live traffic conditions, rather than simply on personal experience. The ability to personalize the ETA is application in this application as well. Further user selectable capabilities can be provided, including selecting when alerts are provided. Still further, on longer trips, the application can provide an alert sooner. The person also can calendar the urgency or importance of the meeting and the application can respond to that importance or urgency level in tailoring when alerts should be given.

IV. Applications.

(a) Estimation of Travel Time with a Historical Traffic Model.

Estimating travel time using a historical traffic model can be performed by stepping through each of the edges in the route's sequence, determining the travel time for each edge, and summing the total. For edges that correspond to segments in the traffic model, a speed value selected from the historical traffic model can be used rather than the "static" speed from the map database.

Under an assumption that the edge to traffic segment (matrix row) conversion is straight-forward, the remaining part is selecting the appropriate time slot (matrix column). However, if an expected departure time is known, then the appropriate slot may be determined by adding the total time accumulated prior to visiting the current edge to the expected departure time to determine an estimated time of arrival at that edge. Thus we have identified the time slot to choose (the containing one, or the next if we are too near to the end of the time interval). The travel time accumulation should be performed in sequential order, and repeated if the departure time changes appreciably.

(b) Estimating Travel Time with Live Traffic Information.

As explained above, live traffic information can be obtained or otherwise gathered, such as from mobile devices functioning as probes for gathering such information. The probes can send reports about the traffic conditions that they experience to a server, which processes those reports and sends information to be received by the mobile devices. The live traffic information can be used in formulating travel time estimates and for routing. The live traffic information can be used in conjunction with historical traffic data. For example, live traffic data can be emphasized for a portion of a route closer to the current location of a device to which the travel time estimate pertains, while usage of historic traffic conditions for portions of the route further from the device can predominate.

(c) User Interfaces and Techniques for Presenting Traffic and Route Information in a User-Friendly Format.

In addition to user interfaces for efficient sharing of ETA information, other information relating to a route, traffic, and other information can be represented in a format that better meets the capabilities and limitations of a mobile platform. Often, mobile platforms have comparatively limited resources, including a comparatively small display, tighter power consumption limits, less available processing power, and other limitations that can be imposed be designers of the hardware, the OS platform, or both.

It is conventional to visually present navigation guidance information, and other information about a route currently being traversed on a 2-D display, as a faithful representation of the roads used during the route. Other information as available or as desired, such as Point of Interest (POI) information is displayed along the route, in the area of the map corresponding to the physical location of the items or conditions depicted. Such a 2-D representation may be helpful or even desirable in travel conditions unfamiliar to a user of a navigation device, where the user desires detailed information about how to traverse a route. However, these disclosures recognize that a user often, perhaps much more often than not, has a thorough understanding of how to navigate a route, because the user takes the route regularly. In such circumstances, a visual depiction of the route does not provide the user with much new information, and requires the user to search that depiction for relevant information.

Thus, some user interfaces according to these disclosures avoid representing routes and other such information as a 2-D representation of topography and geography of a route. Instead, a route can be represented as a linear arrangement along an axis of the device display. Initially, the linear representation at one end corresponds with a start of the route and at the other end corresponds with a destination of the route. As the device moves along the route, the end that originally corresponded to the start of the route can represent a current location of the device on the route (as opposed to showing a progress bar along the route, and keeping the origin and destination visible on the display). In a preferred example, the linear arrangement is provided along a bottom of the display, with a left side corresponding to the origin of the route, and as the route is traversed, to a current position of the device. The remaining description is provided relative to that preferred example; however, these disclosures generally apply equally to other approaches.

The linear arrangement preferably is scaled based on the distance of the route to fit the available dimension of the display used. For example, if the display is two inches wide, and the route is 50 miles long, then each ¼ inch would represent 6.25 miles. As the route is traversed, the scale can be recalculated. For example after traversing 25 miles of the 50 mile route, then each ¼ would represent about 3.12 miles.

Other information pertaining to the route, such as locations of changes in roads, POI, traffic incidents, congestion conditions, weather conditions, and so on, can be displayed above a portion of the linear arrangement corresponding to the portion of the route pertaining to that information (collectively can be called route information). Such linear arrangement is expected to be most appropriate for situations in which a user of the navigation device (or device with navigation capability) has an understanding about how to navigate the route. These disclosures provide that in such cases, details concerning a 2-D representation of a map of the route are not important to the user. Rather, the user may desire to understand conditions along the route which can change from day to day, such as traffic, accidents, or the like. Further, the user may desire to have information concerning POI along the route, such as gas stations or grocery stores. However, the precise location of the POI on a 2-D map representation is not necessarily desirable.

By further example, the user may desire to know about detours to avoid traffic conditions, but often may understand how to navigate those detours. Thus, the important information to the user is that a given route or detour should be taken, rather than a detailed map representation of the detour and its relationship to the original route. Instead, a user may instead benefit most from simply being able to easily get to a selected POI. As such, the present aspects endeavour to simply a user interface for navigation and reduce the amount of information presented to users in situations where they do not need it. These situations are envisioned to include situations in which a user is familiar with a given area or route, such as a route from home to work and back, or trips out of town to known destinations. A navigation device also can be equipped with a full-featured 2-D map representation, but for many common situations, the user is envisioned to benefit from an interface that presents data expected to be most valuable to the user, without a great deal of other data that is less likely to be needed.

Figure 11:
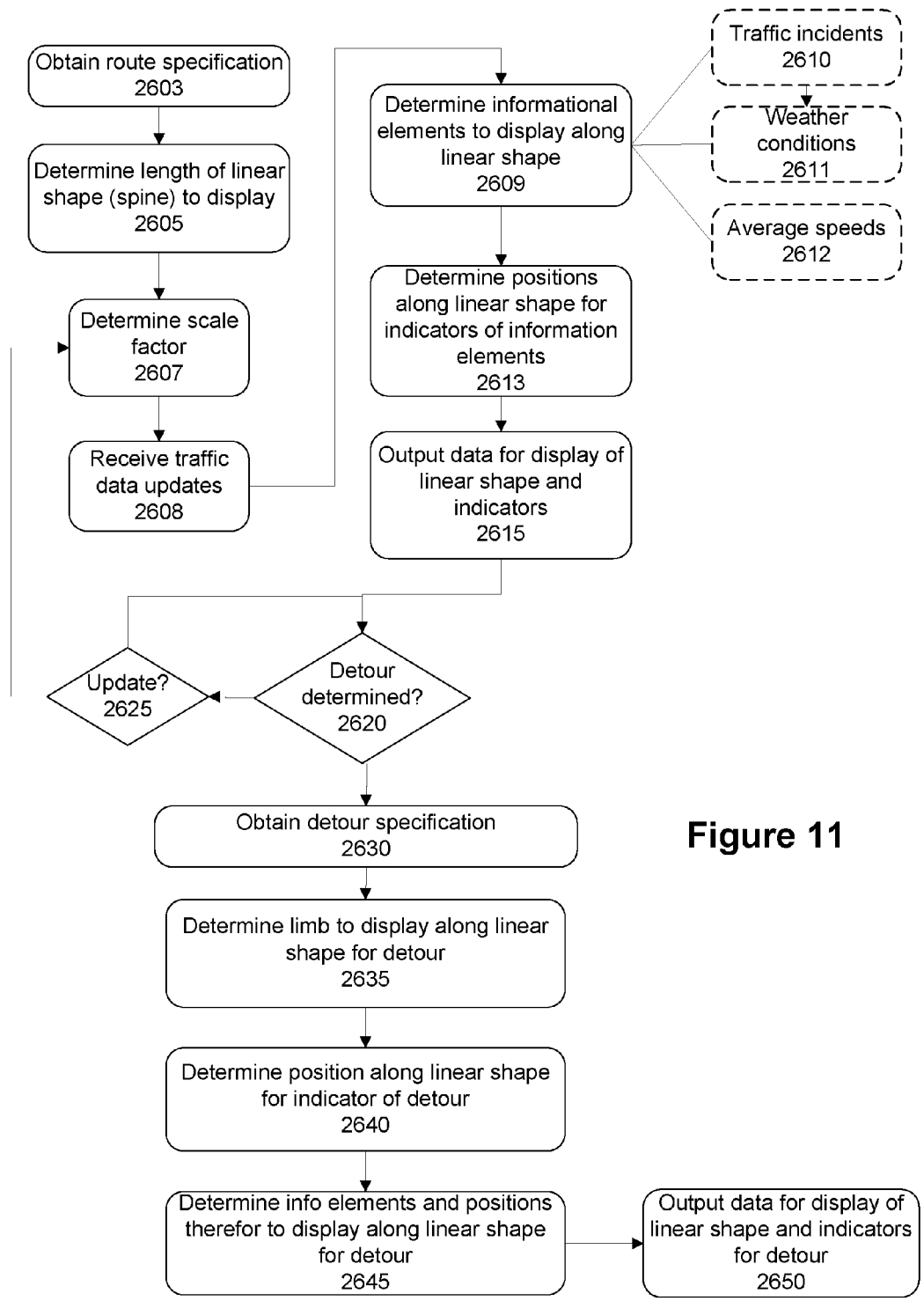
FIG. 11 depicts a method of determining display elements for a way to represent routes and associated information.
Figure 19:
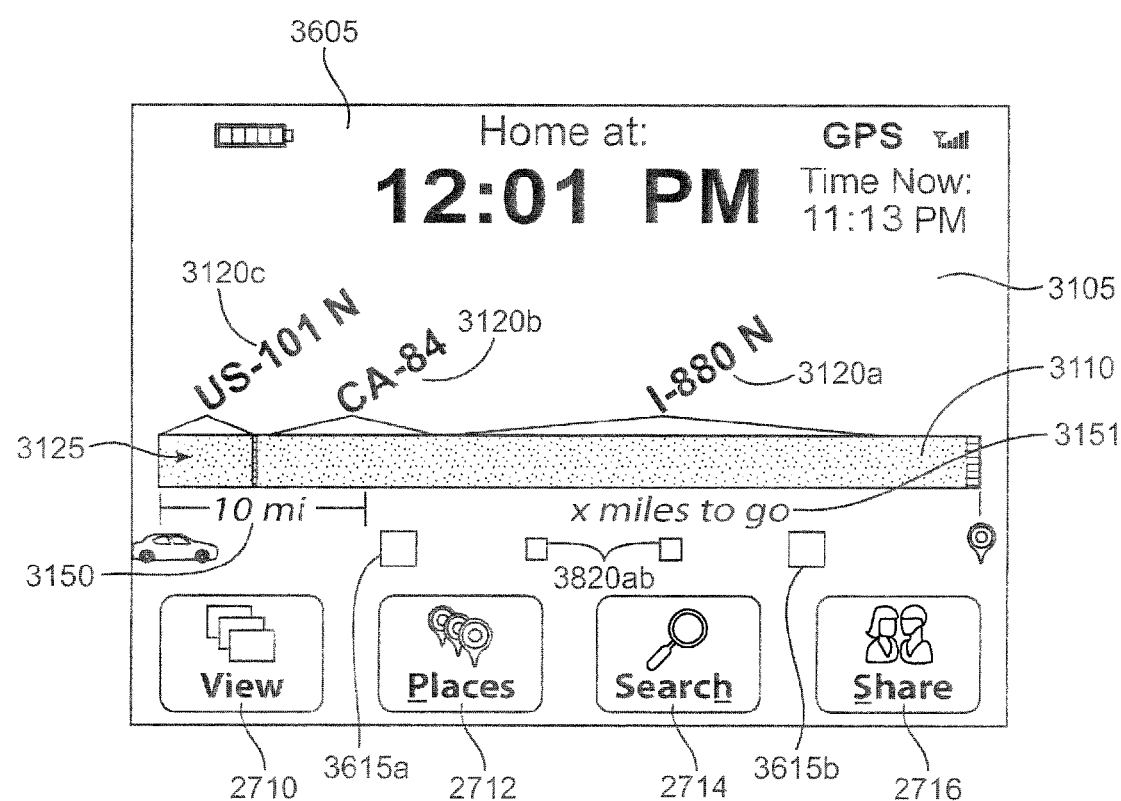
FIG. 19 depicts a search results screen with route information.
Figure 20:
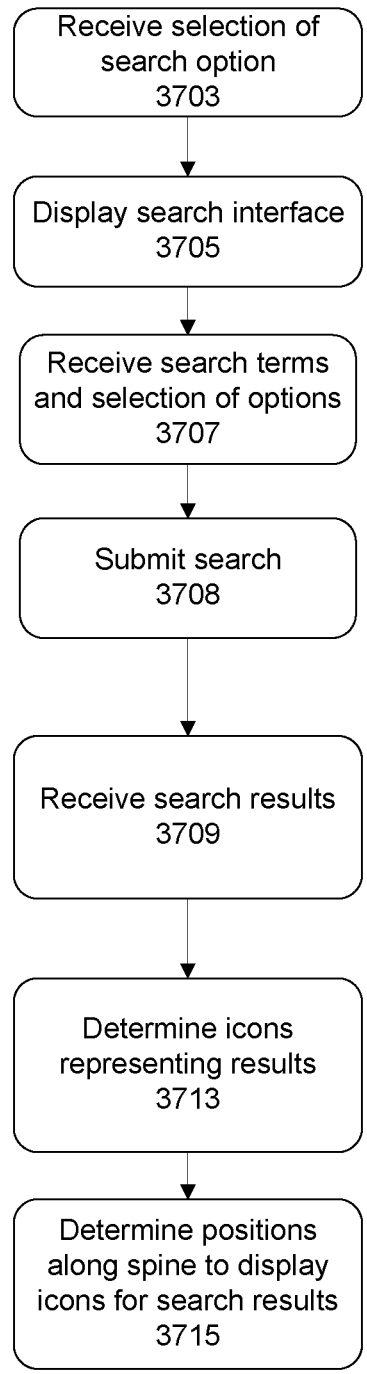
FIG. 20 depicts a method that can be provided with the user interface elements of FIGS. 18 and 19.

Example methods that can be implemented on a mobile device according to this aspect of the disclosure are depicted in FIG. 11 and FIG. 20. FIGS. 14-19 depict user interface aspects relating to such disclosures. These figures are described in more detail below.

V. Example Architectures

To aid the reader in understanding at least one environment in which the notification sub-system 80, and the above-described applications, may be implemented, an example system comprising the wireless network 200 and other components that may be used to effect communications between mobile devices 100 and the notification sub-system 80 will now be described.

As noted above, data communication devices will be commonly referred to as "mobile devices". Examples of applicable mobile devices include pagers, cellular phones, cellular smart-phones, portable gaming and entertainment devices, wireless organizers, personal digital assistants, computers, laptops, handheld wireless communication devices, wirelessly enabled notebook computers and the like.

One exemplary mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a smartphone, a data messaging device, a two-way pager, a cellular telephone with data messaging capabilities, a wireless Internet appliance, or a data communication device (with or without telephony capabilities).

The mobile device may be one that is used in a system that is configured for continuously routing content, such as pushed content, from a host system to the mobile device. An example architecture of such a system will now be described.

(a) Example System Architecture.

Figure 2:
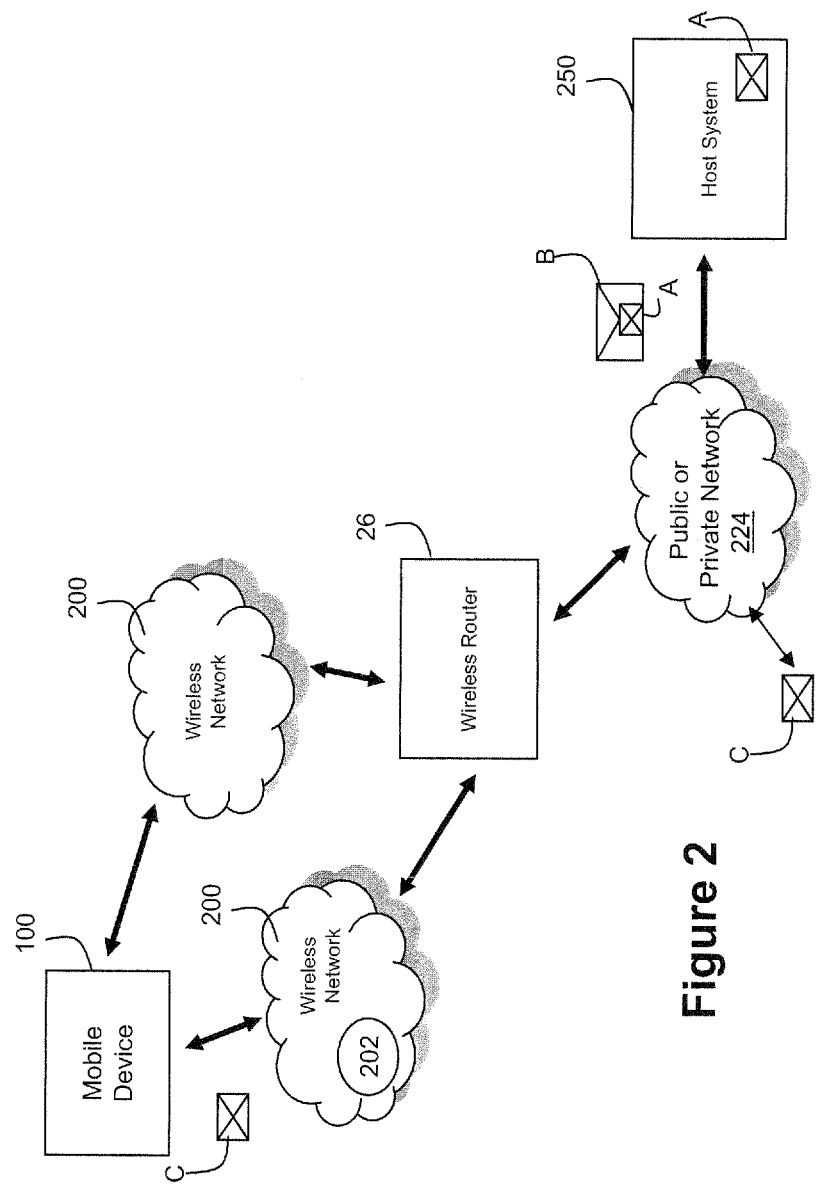
FIG. 2 depicts a system diagram illustrating the environment in which data items are pushed from a host system to a mobile device.

Referring now to FIG. 2, an example system diagram showing the redirection of user data items (such as message A or C) from a corporate enterprise computer system (host system) 250 to the user's mobile device 100 via a wireless router 26 is provided. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 2 represents an internal message sent from, e.g. a desktop computer within the host system 250, to any number of server computers in the corporate network 260 (e.g. LAN), which may, in general, include a database server, a calendar server, an E-mail server or a voice-mail server.

Message C in FIG. 2 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores (for example a data store for e-mail can be an off-the-shelf mail server program such as Microsoft Exchange® Server or Lotus Notes® Server), which typically are behind a corporate firewall.

The mobile device 100 may be adapted for communication within wireless network 200 via wireless links, as required by each wireless network 200 being used. As an illustrative example of the operation for a wireless router 26 shown in FIG. 2, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

(i) Message Router/Relay Server.

A wireless router 26 (sometimes referred to as a "relay") provides a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 5) might be receiving and processing e-mail while an associated program (e.g. an e-mail wireless mobility agent) is also monitoring the mailbox for the user and forwarding or pushing the same e-mail to a wireless device 100.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol.

This wireless network 200 abstraction can be accomplished by wireless router 26, which can implement this routing and push functionality.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

Providing push services for host systems 250 can be bettered by the wireless router 26 implementing a set of defined functions. The wireless router 26 can be realized by many hardware configurations; however, features described likely would be present in these different realizations.

Figure 4:
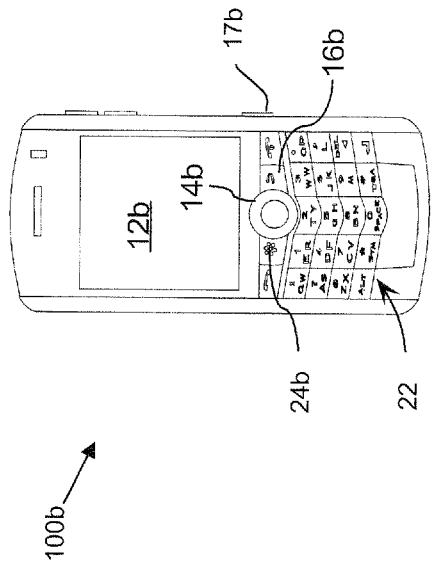
FIG. 4 depicts a schematic diagram of another mobile device and a display screen therefor.
Figure 3:
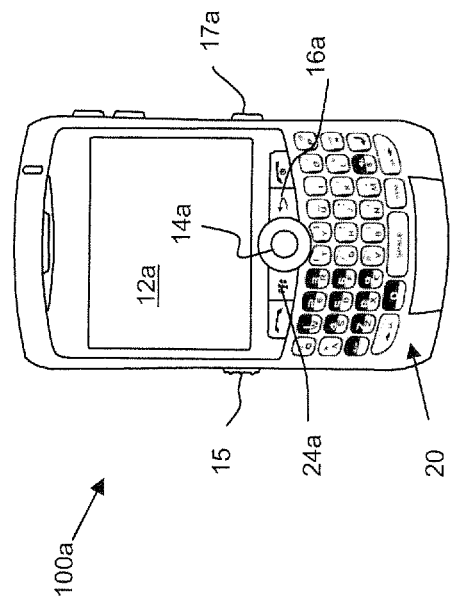
FIG. 3 depicts a schematic diagram of a mobile device and a display screen therefor.

Referring to FIGS. 3 and 4, one example of a mobile device 100a is shown in FIG. 3, and another example of a mobile device 100b is shown in FIG. 4. More generally, the numeral "100" will hereinafter refer to any mobile device 100, and by explanation and reference, the examples 100a and 100b of FIGS. 3 and 4. A similar numbering convention is used for some other general features common between FIGS. 3 and 4 such as a display 12, a positioning device 14, a cancel or escape button 16, a camera button 17, and a menu or option button 24.

The mobile device 100a shown in FIG. 3 comprises a display 12a and the cursor or view positioning device 14 shown in this embodiment is a trackball 14a. Positioning device 14 may serve as another input member and is both rotational to provide selection inputs to the main processor 102 (see FIG. 5) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example situated on the front face of a housing for mobile device 100a as shown in FIG. 3 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 3 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 4 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 4, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

The mobile device 100, a wide range of one or more positioning or cursor/view positioning mechanisms such as a touch pad, a positioning wheel, a joystick button, a mouse, a touch-screen, a set of arrow keys, a tablet, an accelerometer (for sensing orientation and/or movements of the mobile device 100 etc.), or other input device, whether presently known or unknown, may be employed. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14b, escape button 16b and menu or option button 24 similar to that shown in FIG. 4 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 3 and 4, other configurations such as clamshell or "flip-phone" configurations are also applicable.

Now, to aid the reader in understanding the structure of the mobile device 100 and how it can communicate with the wireless network 200, reference will now be made to FIGS. 5 through 8.

(ii) Example Mobile Device Architecture.

Figure 5:
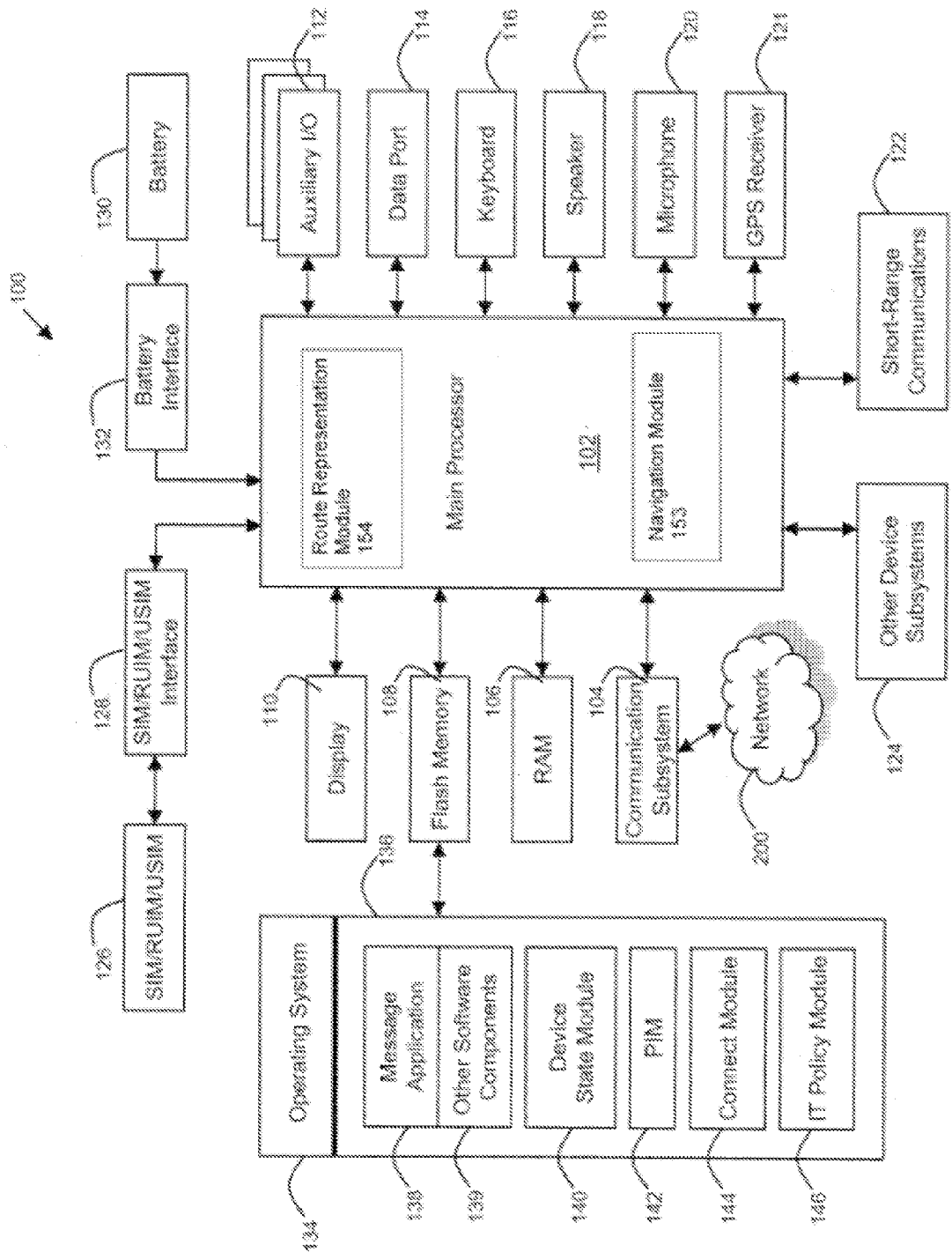
FIG. 5 depicts a block diagram of an exemplary embodiment of a mobile device.

Referring first to FIG. 5, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the aspects disclosed herein can be used with and adapted for other suitable communication protocols and standards that may be developed in the future. The wireless link connecting the communication subsystem 104 with the wireless network 200 represents one or more different Radio Frequency (RF) channels, operating according to defined protocols specified for GSM/GPRS communications.

The main processor 102 also can interact with additional subsystems (as available) such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 can be a battery-powered device (or be battery powered at some times or in some modes, while being powered by an automobile or wall power or another source of energy at other times) and typically includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100. In some embodiments, a plurality of batteries, such as a primary and a secondary batter may be provided.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

(A) Mobile Device Software & Firmware.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 can provide persistence, i.e. the device state module 140 provides for availability and storage of potentially important device data. Device state module 140 can be implemented using flash memory 108 (or other non-volatile memory technologies), so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 can receive IT policy data that encodes IT policies, and may be responsible for organizing and securing rules, such as a "Set Maximum Password Attempts" IT policy, and password expiration policies.

Other types of software applications or components 139 can also be installed on the mobile device 100. Examples of third party applications include games, calculators, and utilities. The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

(B) Wireless Communication Sub-system.

Figure 6:
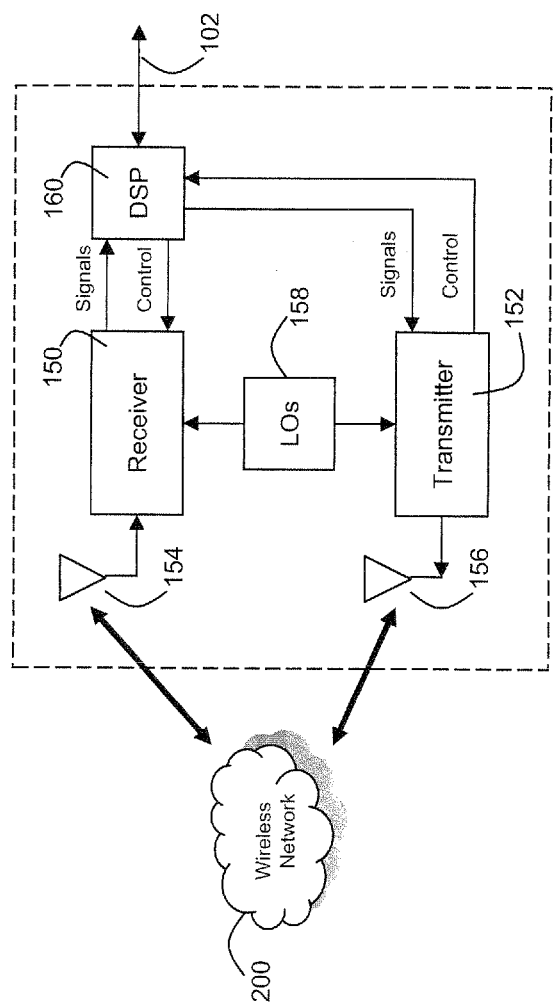
FIG. 6 depicts a block diagram of an exemplary embodiment of a communication subsystem component of the mobile device of FIG. 5.

Referring now to FIG. 6, an exemplary block diagram of the communication subsystem component 104 is shown. The communication subsystem 104 includes a receiver 150, a transmitter 152, and example associated components such as one or more embedded or internal antenna elements 154 and 156, Local Oscillators (LOs) 158, and a processing module such as a Digital Signal Processor (DSP) 160. The particular design of the communication subsystem 104 can be dependent on the communication network 200 with which the mobile device 100 is intended to operate. Thus, it should be understood that the design illustrated in FIG. 6 serves only as one example. Radios also can be implemented differently, for example, LOs can be avoided by avoiding intermediate frequencies, such as by using direct digital sampling.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156.

The wireless link between the mobile device 100 and the wireless network 200 can contain one or more different channels, typically different RF channels, and associated protocols used between the mobile device 100 and the wireless network 200. An RF channel is a limited resource that should be conserved, based on concerns such as limits of overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods. The receiver 150 also can be turned on to poll for data to be retrieved.

Some aspects of the description provided relate to a system architecture where information can be pushed to mobile devices. Such system architectures can operate to push information responsive to a request from a mobile. For example, mobile device 100 can request information periodically, and the system can respond with any messages or notifications determined to be applicable to device 100.

(C) Example User Interface.

Figure 7:
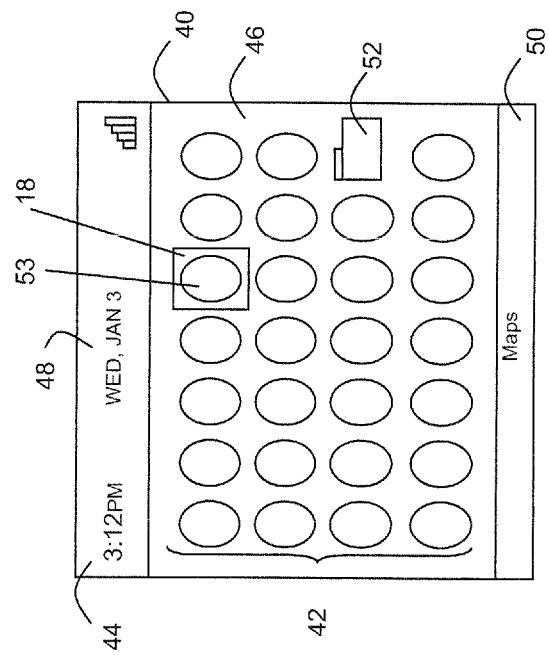
FIG. 7 depicts a screen shot of an exemplary home screen displayed by a mobile device.

Turning now to FIG. 7, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 can provide information to the user based on the location of the selection cursor 18, e.g. by displaying a name for the icon 53 that is currently highlighted.

An application, such as a maps program 60 (see also FIG. 8) may be initiated (opened or viewed) from display 12 by highlighting a corresponding icon 53 using the positioning device 14 and providing a suitable user input to the mobile device 100. For example, maps program 60 may be initiated by moving the positioning device 14 such that the icon 53 is highlighted by the selection box 18 as shown in FIG. 7, and providing a selection input, e.g. by pressing the trackball 14*b*.

Figure 8:
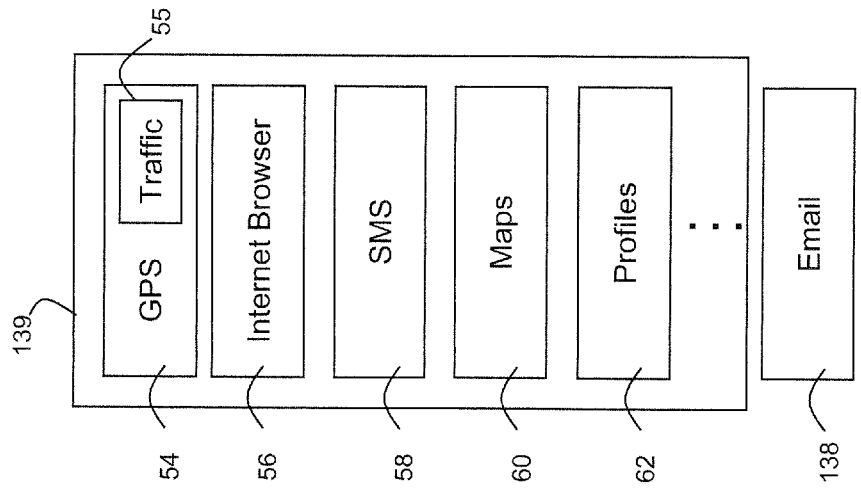
FIG. 8 depicts a block diagram illustrating exemplary ones of the other software applications and components shown in FIG. 5.

FIG. 8 shows an example of how other software applications and components 139 that may be stored on and used with the mobile device 100 can use the user interface. Only examples are shown in FIG. 8 and such examples are not to be considered exhaustive. In this example, a global positioning system (GPS) application 54, internet browser 56, simple message service (SMS) 58, maps program 60 and a profiles application 62 are shown to illustrate the various features that may be provided by the mobile device 100. The GPS application 54, in this example, comprises a traffic module 55, which represents any sub-program, sub-routine, function or other set of computer executable instructions for providing device data 78 to the notification sub-system 80, when such data 78 is obtained using the GPS application 54. Also shown in FIG. 8 is the message application 138, which in the following will be referred to as an email application 138 for clarity. It will be appreciated that the various applications may operate independently or may utilize features of other applications. For example, the GPS application 54 may use the maps program 60 for displaying directions to a user.

(iii) Notification Sub-System.

Figure 9:
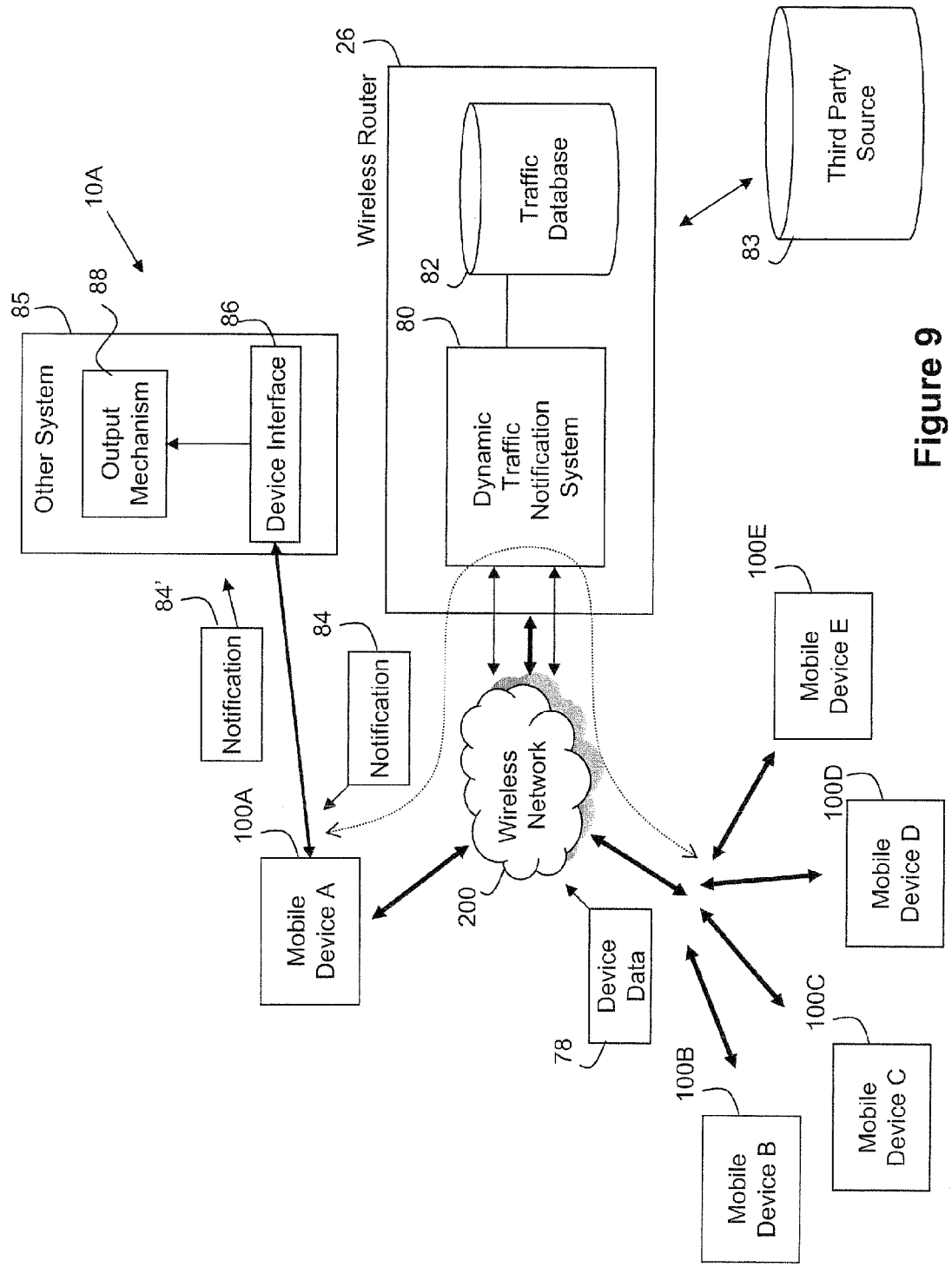
FIG. 9 depicts a schematic diagram showing an example configuration for the embodiment of FIG. 1 when implemented with the wireless router shown in FIG. 2.

Turning now to FIG. 9, an exemplary implementation of the notification sub-system 80 is shown, wherein the notification sub-system 80 is hosted by the wireless router 26 described above. In this example, the wireless router 26 is responsible for routing messages from and to mobile devices 100A-100E and thus has the ability to obtain device data 78 provided by a plurality of such mobile devices 100 in order to prepare notifications 84 for those plurality of mobile devices 100 and other mobile devices. Consistent with FIG. 1, the implementation exemplified in FIG. 9 illustrates obtaining device data 78 from each of mobile devices 100B through 100E and provides a notification 84 to mobile device 100A. It will be appreciated that the device data 78 and notifications 84 may comprise separate and distinct data packages sent using separate protocols or may take advantage of existing communication methods such as email, SMS, etc.

The notification sub-system 80, which in this example can reside at the wireless router 26, stores traffic-related data in a traffic database 82. Such traffic-related data may comprise any device data 78 obtained from various mobile devices 100, copies of notifications 84 that have already been sent (or are about to be sent—to facilitate repeated use of the same notifications 84), and any other information that may be required to carry out the delivery of a notification 84 based on the acquisition of device data 78, several examples of which will be explained below. It will be appreciated that the traffic database 82 may represent any memory, datastore, or storage medium and may or may not be internal to the wireless router 26. For example, the traffic database 82 may be maintained by a third party or configured to be an integral component of the notification sub-system 80. As such, the configuration shown in FIG. 9 is merely for illustrative purposes and variations thereof are equally applicable according to the principles described herein. The notification sub-system 80 may also have access to a third party source 83 to obtain additional data pertaining to traffic events and other location based information. For example, the third party source 83 may represent police or emergency crew dispatchers that provide more detailed information pertaining to accidents. The third party source 83 may also provide information such as the locations of gas stations, tow truck origins, and so on, for use in various embodiments as will be exemplified below. There may be any number of third party sources 83 available to the notification sub-system 80, which can vary according to the particular embodiment.

FIG. 9 also illustrates that, in addition to providing an alert to the user of the mobile device 100A using the notification 84 on the mobile device 100A itself, the notification may be used in other ways. In this example, a copy of the notification 84' is provided to an other system 85 through a device interface 86 such that an alert may be provided to the user through an output mechanism 88. For example, the vehicle 10A is shown as comprising the other system 85, which may represent a vehicle entertainment or navigation system, a vehicle engine control system, as well as various dashboard implemented systems. In this way, the mobile device's access to the information comprised in the notification 84 can be shared with other systems in the same locale as the mobile device 100A in order to provide a wide range of alert types and to coordinate with other sub-systems.

The configuration shown in FIG. 9 can also provide for a mobile device 100 without a GPS receiver 121 to utilize location and speed information acquired by the vehicle 10, for example through a vehicle navigation system, an on-board-diagnostics (OBD) connection or both. As such, the mobile device 100 also can be the communication link between a vehicle 10 and the notification sub-system 80 to accommodate a wider range of environments and configurations. Also, the mobile device 100 may itself be integral to the vehicle 10 (not shown), e.g. where the vehicle has a GPS receiver and wireless connectivity. The principles described herein may be applied to a mobile device 100 in any form, including wherein the mobile device 100 is provided as a sub-system of a vehicle 10.

VI. Notifications.

The above disclosure included description of an example system architecture that can provide notifications to wireless devices, such as notifications relating to traffic conditions. Further description of such notifications, such as conditions which can generate notifications, how they may be formed, and their content is provided below.

Figure 10:
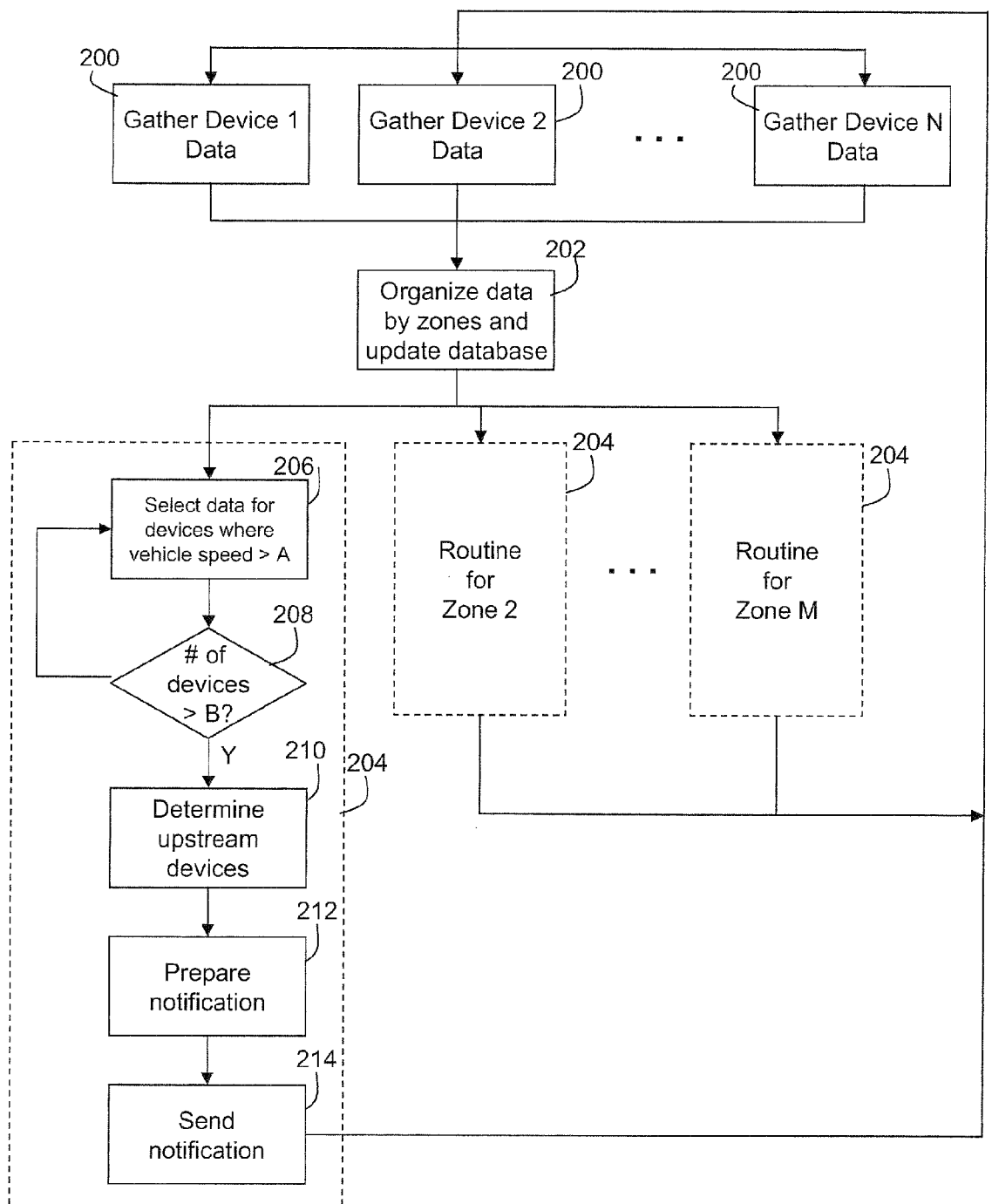
FIG. 10 depicts a flow diagram illustrating exemplary operations performed by a traffic notification system for preparing and providing a traffic notification to a mobile device.

Turning now to FIG. 10, one example illustrating the preparation of a notification 84 using device data 78 from a plurality of mobile devices 100 is shown. Device data 78 from N mobile devices 100, e.g. devices 1, 2, . . . , N, is obtained by the notification sub-system 80 at 200, which data 78 is then stored in the traffic database 82. In the example shown in FIGS. 1 and 9, device data 78 is obtained from mobile devices 100A, 100B, 100C, 100D, and 100E. At 202, the device data 78 is then organized based on the zone from which it originates and the traffic database is updated. For example, the device data 78 from mobile devices 100B-100E would be grouped into one zone, whereas the device data 78 from mobile device 100A would be grouped into another zone.

(i) Location-Dependent Notifications.

The device data 78 may be stored according to the corresponding mobile device 100 or may instead be stored according to the current zone. In either case, the device data 78 can be time stamped such that a mobile device's movements can be tracked between snapshots of data and such that previous notifications and progress of that mobile device 100 is known. Also, movements of mobile devices 100 from one zone to another can be tracked. In this way, as the mobile device 100 moves progressively closer to a congested zone 2, the notifications may be modified to more intelligently redirect the mobile device 100. For example, a mobile device 100 that is 20 km away from the congested zone 2 may receive a different, less urgent warning, than a mobile device 100 that is 5 km away from the congested zone 2 or may be given a different suggestion for an alternative route. The combination of location and speed information, tracked over time can thus allow the notification sub-system 80 to provide a cascade of notifications 84 according to the mobile device's location with respect to the congested zone 2.

(ii) Determining to Send a Notification.

The device data 78 can be grouped and used to perform a notification preparation routine at 204, for each zone at an applicable time. The routine 204 determines the speed at which each mobile device 100 and thus each vehicle 10 is travelling at 206. A criterion such as "Is speed<X km/h" can be used to determine the presence of traffic congestion whereby the device data 78 for vehicles 10 having a vehicle speed greater than a threshold A are selected and can be used in determining traffic congestion.

For example, in FIG. 1, vehicles 10B, 10C, and 10D are, in the snapshot shown, travelling at a relatively low rate of speed whereas vehicle 10E is travelling at a relatively higher or "normal" rate of speed. In this example, the device data 78 for vehicles 10B, 10C, and 10D would be chosen in step 206 whereas the device data 78 for vehicle 10E would be ignored. At 208 the notification sub-system 80 may then determine if a predetermined number of mobile devices 100 (a second threshold B shown in FIG. 10) have been chosen at step 206. In other words, the notification sub-system 80 can use a plurality of measurements to confirm that traffic congestion is present, to avoid false positives, e.g. where one vehicle is pulling over, exiting a highway or turning. By having access to vehicle data 78 for multiple mobile devices 100, the notification sub-system 80 can better distinguish traffic congestion from anomalies and prepare dynamic notifications 84 accordingly.

The speed measurements that are chosen at 206 may then be tallied at 208 and compared to threshold B, which may be for example B=2. In such an example, if 3 or more mobile devices 100 are travelling below a predetermined speed threshold, then a congested zone 2 is identified. The notification 84 may then be sent to any number or all connected mobile devices 100 or, as shown in FIG. 10, the notification sub-system 80 may also determine a set of one or more upstream mobile devices 100 that are headed to or are within a predetermined vicinity of the congested zone 2 at 210. In the present example, upon detecting that mobile devices 100B, 100C, and 100D form a congested zone 2, and determining that mobile device 100A is presently in or headed towards an upstream zone 8, the notification sub-system 80 may then identify mobile device 100A as a candidate for receiving a notification 84. The notification 84 may then be prepared at 212 and sent to the candidate mobile devices 100 at 214.

(iii) Condition Monitoring.

The preparation of the notification 84 at 212 may include sub-steps (not shown) of determining, based on information in the traffic database 82, forms of communication for the notification 84, and may similarly determine appropriate content for a particular type of alert. For example, mobile device 100A may have selected an available option to receive an auditory alert rather than a visual alert and thus the notification 84 would be prepared accordingly.

The routine 204 shown in FIG. 10 may be executed continuously, semi-continuously, periodically or according to external events such as the receipt of a certain number of device data 78. Also, at 208, if it is determined that there are not enough speed measurements to identify a congested zone 2, the traffic database 82 may be periodically referenced such that as new device data 78 is received, the notification sub-system 80 can dynamically react to changing environments. For example, a first wireless-enabled mobile device 100 may enter a traffic jam, which would not trigger the detection of a congested zone but as additional mobile devices 100 enter that zone, the traffic jam would then trigger.

By continually or periodically referencing the incoming device data 78 the traffic jam can be more quickly detected. Such periodic referencing also can provide for the notification sub-system 80 to avoid triggering a notification 84 if, for example, the traffic congestion eases a few seconds later and no further mobile devices 100 are affected. FIG. 10 also illustrates that the notification sub-system 80 can be adapted to cover multiple zones and can use any appropriate logic to determine which mobile devices 100 (if any) should receive a notification 84. For example, mobile device 100C, which is currently in congested zone 2, provides device data 78 that enables an alert to be provided to the user of mobile device 100A but may also receive another notification 84 (not shown) that alerts the user of mobile device 100C of traffic congestion further down stream, which is determined using device data 78 from other mobile devices. In this way, the device data 78 is effectively shared amongst all connected mobile devices 100 via the wireless network 200, wireless router 26, and notification sub-system 80, the notification sub-system 80 capable of first organizing and interpreting the device data 78 to provide dynamic and meaningful alerts for each mobile device user.

(iv) Variable Thresholds for Congestion Notification.

The notification sub-system 80 may also execute different routines 204 for different zones, for example, to account for different circumstances. For example, certain roadways may be known to have significant slow-downs during rush hour and thus different thresholds may apply at different times of the day. In this example, detected speeds of, e.g. 40 kph, in a 100 kph zone may not be considered congestion but normal volume. Turning to FIG. 19, an example of a variation of the routine 204 is shown. In this variation, the notification sub-system 80, for the particular zone, first would determine (205) the time at which the device data 78 was collected. In this example, if the relevant time is between X and Y, a different threshold C can be used at 206' to select mobile devices that are considered to be moving slower than expected. On the other hand, outside of this range, the normal threshold A can be used. This allows the notification sub-system 80 to lower the threshold hold during select times during the day to take into account known or empirically derived information. For example: Highway 6 is typically slow from 7 am to 9 am.

VII. An Example Approach to User Interfaces and Techniques for Presenting Traffic and Route Information in a User-Friendly Format.

In addition to the above-described functionality and user interface elements, traffic information and other route information also can be displayed in optimized formats, as explained below, with respect to the method depicted in FIG. 11, and then with respect to example user interface elements depicted in FIGS. 14-19.

Figure 12:
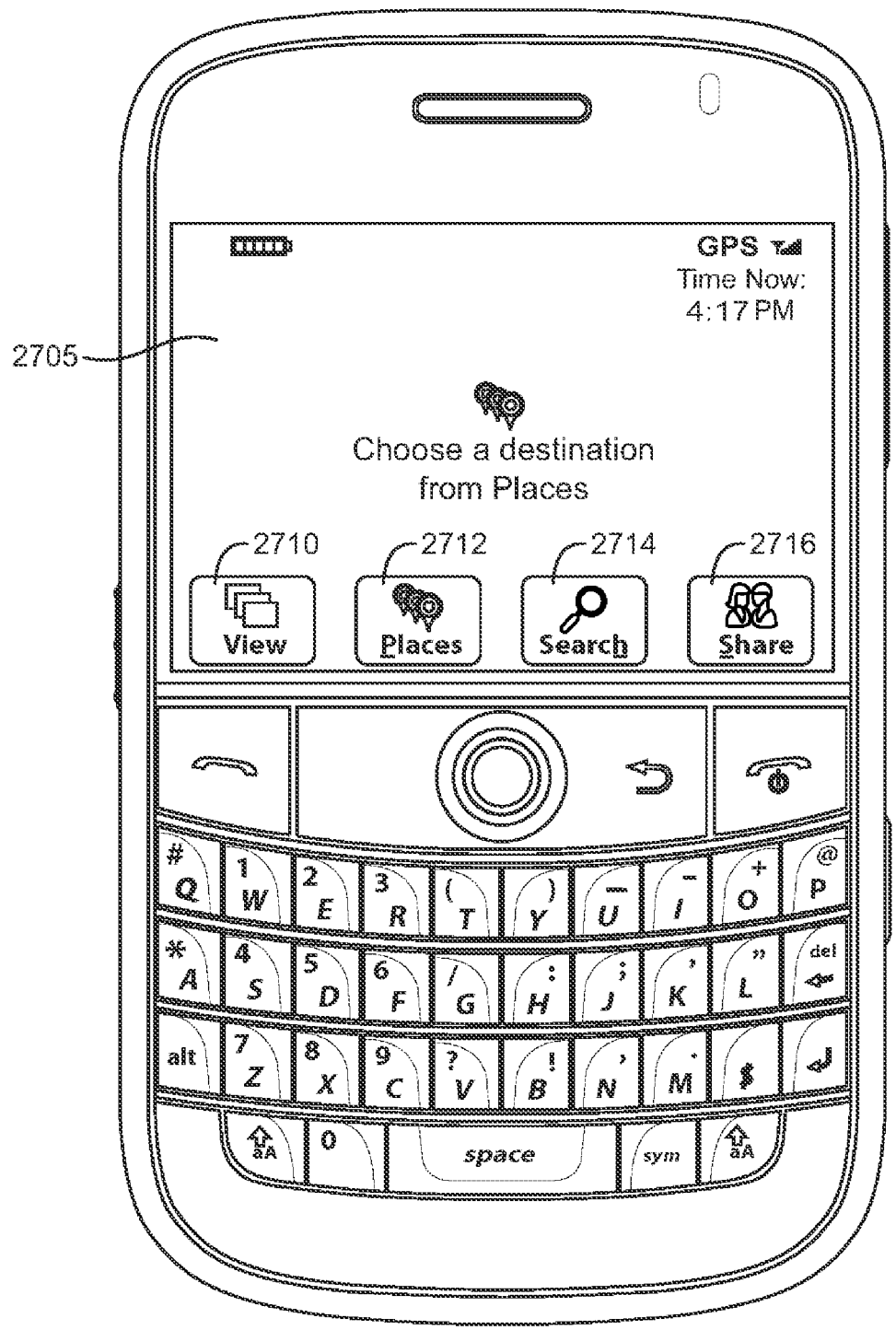
FIG. 12 depicts an example start screen of a navigation function that can provide functionality and use technology described above.
Figure 13:
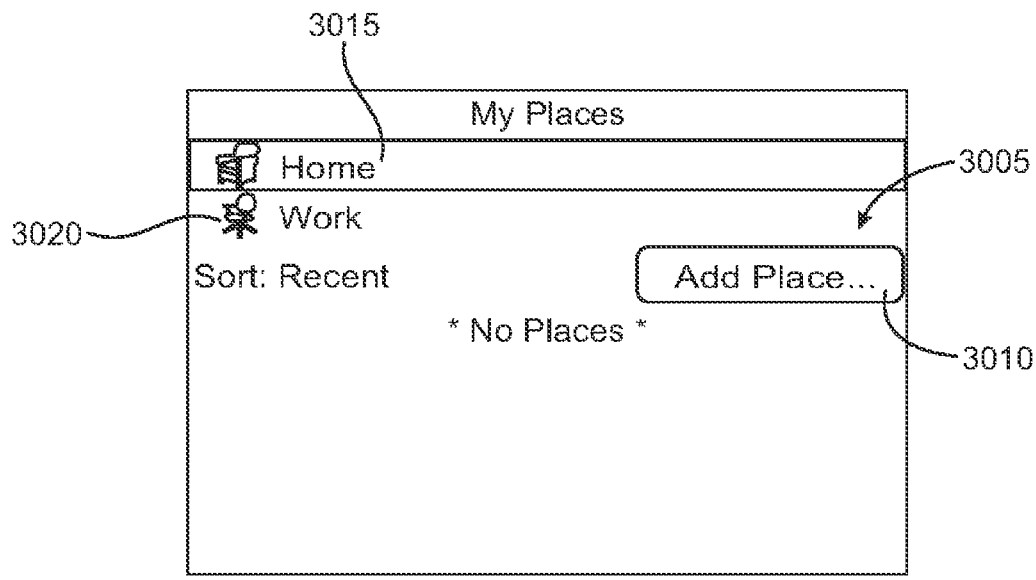
FIG. 13 depicts a user interface element within the navigation application.

FIG. 12 depicts an example user interface screen displayed on a device, when a navigation application is selected or activated. FIG. 12 depicts a user interface element 2705 prior to obtaining a positional fix. In this pre-location determination period, the depicted user interface element 2705 accepts inputs that can include selection of a view 2710, a places 2712, a search 2714, and a share 2716 element. User interface element 2705 can suggest to choose a destination by selection of places 2712, which would cause the user interface element 2705 to transfer to a user interface element depicted by FIG. 13. FIG. 13 depicts that user interface element 3005 for defining places can include an add place button 3010, a pre-defined destination of home 3015, and of work 3020 can be defined.

Figure 14:
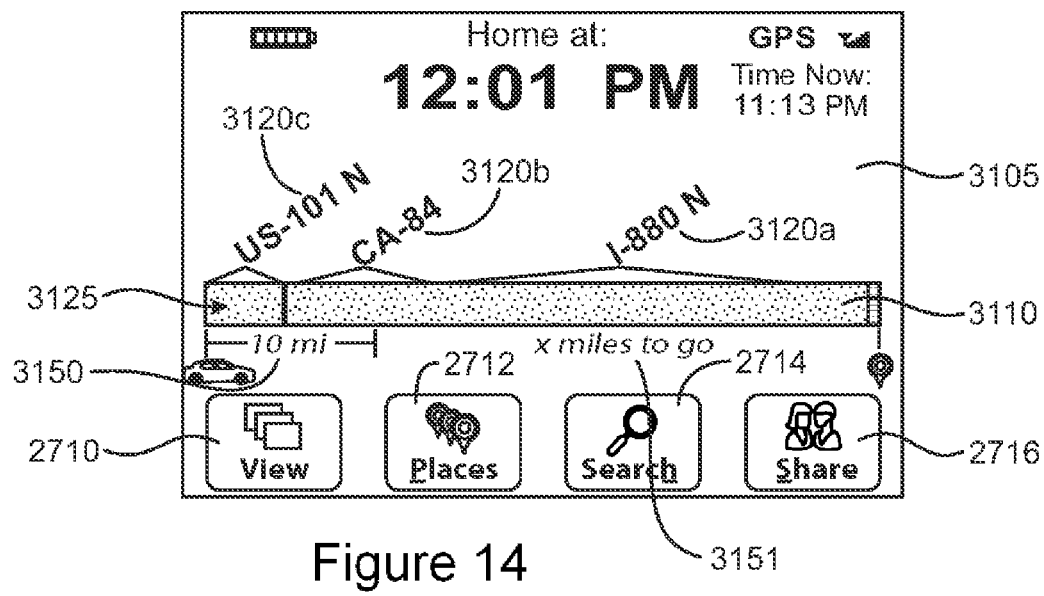
FIG. 14 depicts a first example user interface element relating to route representation.

As shown in FIG. 14, routes, which can comprise a number of interconnected road (travel) segments are depicted (on user interface element 3105) as linear representations (also can be called a spine or a trunk), such as linear shape 3110 (which in that it represents a route, also can be termed a linear representation of such route). Such linear representation can be oriented along one axis of a 2-D display of the device, such as along an axis that is parallel to a field of view of a user of the device (and thus can vary if the device is turned on its side, such that the route orientation can turn to maintain that orientation with respect to the viewpoint of the user). Preferably, the linear representation takes up most of the available display width. Indicators of information such as roads to be taken along the route can be represented at angles along the linear representation (e.g., indicators 3120a, 3120b, and 3120c). Indication of traffic congestion information (3125) can be represented by different cross hatching or colors within the area of the linear representation 3110, itself.

To the extent that these indicators apply to one or more portions of the route (as opposed to a point on the route), these indicators also can be viewed as information segments. For example indication 3125 of traffic congestion can be termed an information segment for the portion of the route on which that congestion occurs, and which is indicated by indication 3125. As can be discerned, an information indicator thus can be an indicator of a point along a route to which an informational item is relevant, as well as a segment of a route along which such informational item is relevant. As will become apparent, such informational indicators can be overlayed on the linear representation (linear shape) of the route, as is 3125, above or below such linear representation (as in rain indicator 3341 in FIG. 16, for example). A collection of informational indicators can be displayed for any given route, represented by such a linear shape, as explained and exemplified by the discussion below.

With this overview, the method of FIG. 11 is described. A scale indicator (3150) can be provided, as well as a textual expression (3151) of remaining miles to go to arrive at the destination on the depicted route.

FIG. 11 depicts that a route specification can be obtained (2603), a length of a spine to be selected to represent the route can be chosen (2605), such as based on an available display width. Based on a distance of the route (which can be part of the route specification), a scale factor is determined 2607, which will govern which portion of the spine will be correlated with or otherwise represent a given portion of the route. Traffic data updates can be received (2608), and informational elements to be displayed along the route can be determined (2609).

Examples of such informational elements are described in further detail in FIGS. 16-19, and can include traffic incidents 2610, weather conditions 2611, and average speed 2612 data. Positions along the spine that correspond with positions of the informational elements determined are also determined (2613). For example, an accident along a portion of I-880 (see FIG. 14), would be displayed along a part of the spine identified as corresponding to I-880.

Data describing the linear shape and the indicators for the informational elements are output (2615). Regular updates (2625) can be provided, by receiving updated position data, updating (2607) a scale factor based on the current device position, and potentially receiving traffic updates (2608). The scale factor can be used to scale an attribute of the route to a corresponding attribute of the linear shape, which represents the route. For example, the scale can be based on a total distance of the route and a length of the linear shape, or the time of the route and the length of the linear shape (i.e., the length of the linear shape can be made to correspond to more than one attribute).

The depicted method can continue with a determination whether a detour is determined (2620). A detour can be determined based on changing traffic conditions, for example. A detour determination can result in obtaining (2630) a specification of the detour, determining (2635) a linear representation (a limb) for the detour, and determining (2640) a position along the spine at which to display an indication of the detour (see FIG. 16, described below). Additionally, the depicted method can include determining informational elements and positions for indications thereof along the limb representing the detour route (2645). Data for the limb and the positions of the indications of the information elements along the limb can be output (2650).

Figure 15:
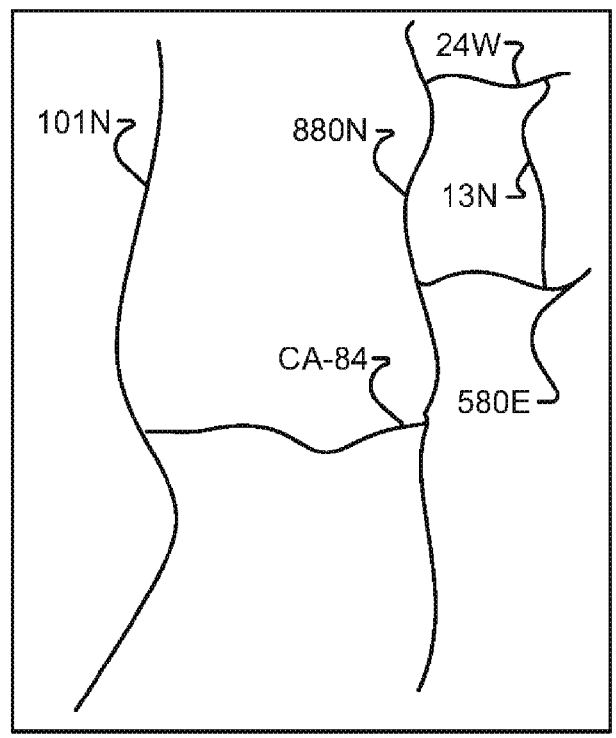
FIG. 15 depicts a second example user interface element relating to route representation.

FIG. 14 (and other figures by extension) may be better understood by reference to FIG. 15, which depicts a more typical approach to how a route is represented on navigation systems, in that the route depicted in FIG. 14 includes a portion of US-101N, CA-84, and I-880. A relative arrangement of these roads is shown in FIG. 15. It can thus been seen that navigation systems typically represent route information, and other information about a route in progress by displaying a representation like that of FIG. 15, which shows the relative spatial arrangement of these roads. By contrast, FIG. 14 depicts that a given route, regardless of the spatial arrangement of its component roads (and road segments) is depicted as a linear shape. Although it may be coincident that on a certain large scale, a typical spatial arrangement such as depicted in FIG. 15 may appear linear (or at least some small portion of it), FIG. 15 does not depict what would be considered a linear shape that represents a route according to this disclosure.

Figure 16:
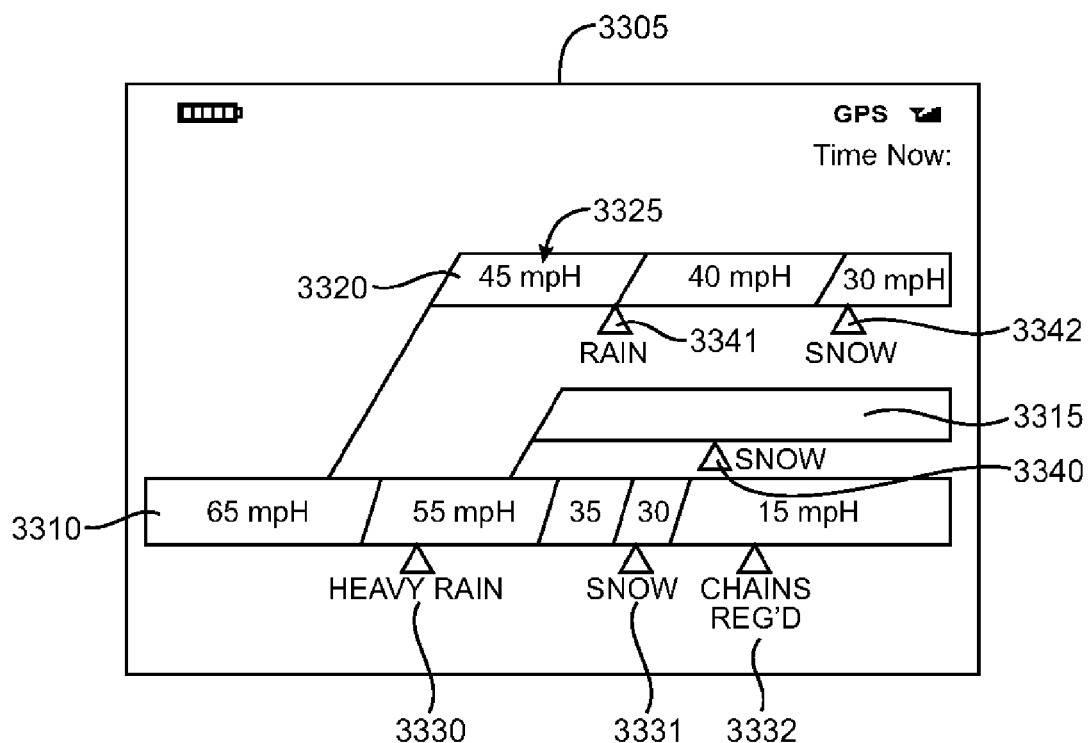
FIG. 16 depicts a third example user interface element relating to route representation.

User interface aspects relating to the method of FIG. 11 are also depicted in FIGS. 16-19. FIG. 16 depicts (on user interface element 3305) a spine 3310, for a main route. There are two limbs 3315 and 3320 leaving spine 3310, depicted at positions along spine 3310 at which those detours would be taken (e.g., where those roads depart the road of the main route). In the example of FIG. 14, traffic congestion information was presented as colors or as hatching in the spine area itself. In FIG. 16, such information is presented as average miles per hour (3325) along respective portions of the route depicted by spine 3310. Indications of weather-related informational elements are shown displayed below spine 3310, and include heavy rain 3330, snow 3331 and chains required 3332 advisories.

Indicators for informational elements relevant to the detours also can provided, such as indicators 3340, 3341, and 3342 for snow, rain and snow, respectively along the first and second limbs 3315 and 3320. Although not depicted, each of limbs 3315 and 3320 also can have displayed information about the roads to be taken along the route (see FIG. 14). The limbs 3315 and 3320 can ultimately represent some portion of the same roads or road segments as the main route, ultimately arriving at the same destination.

Figure 17:
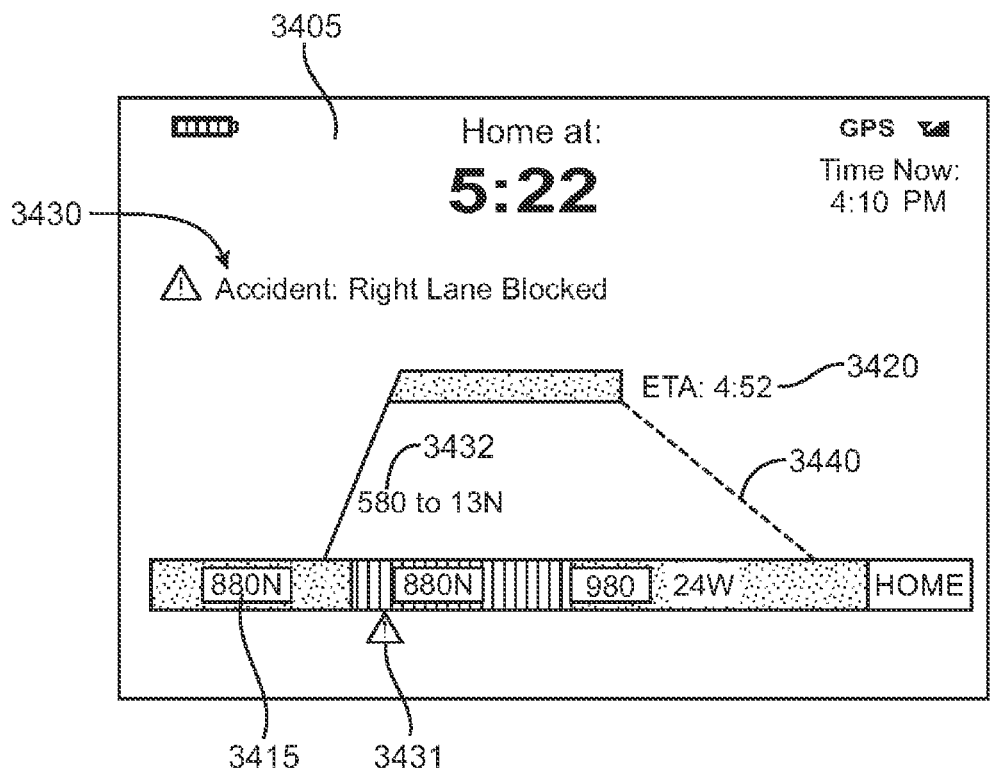
FIG. 17 depicts a third example user interface element relating to route representation.

However, a user interface element 3405 of FIG. 17 depicts an alternative wherein, a limb represents only those portions of the road segments that are different from the main route. FIG. 17 also depicts that road identifier information can be placed within the area of the linear representation of the spine or limbs (e.g., 880N identifier 3415). Additionally, a separate ETA calculation for a detour can be displayed near its limb (e.g., ETA 3420). Thus, a savings in travel time by taking the route can be understood easily by a user.

FIG. 17 also depicts that a concise warning or message 3430 about why the detour is suggested can be provided. The detour linear representation can be connected by a line to the trunk of the main route. A dashed line (3440) (or solid line) can show where the detour ultimately converges back to the main route). Although not depicted, if the detour is taken, then the limb for the detour can be displayed instead as the trunk. The formerly main route may be displayed as a limb. FIG. 17 also depicts that a plurality of indicators for warnings can be displayed, in that an indicator 3431 of an accident can be displayed as shown, along with a warning 3430, which provides further information about that indicator 3431. Multiple such warnings can be arranged on the display as shown.

VIII. Search Interface and Results Display.

Figure 18:
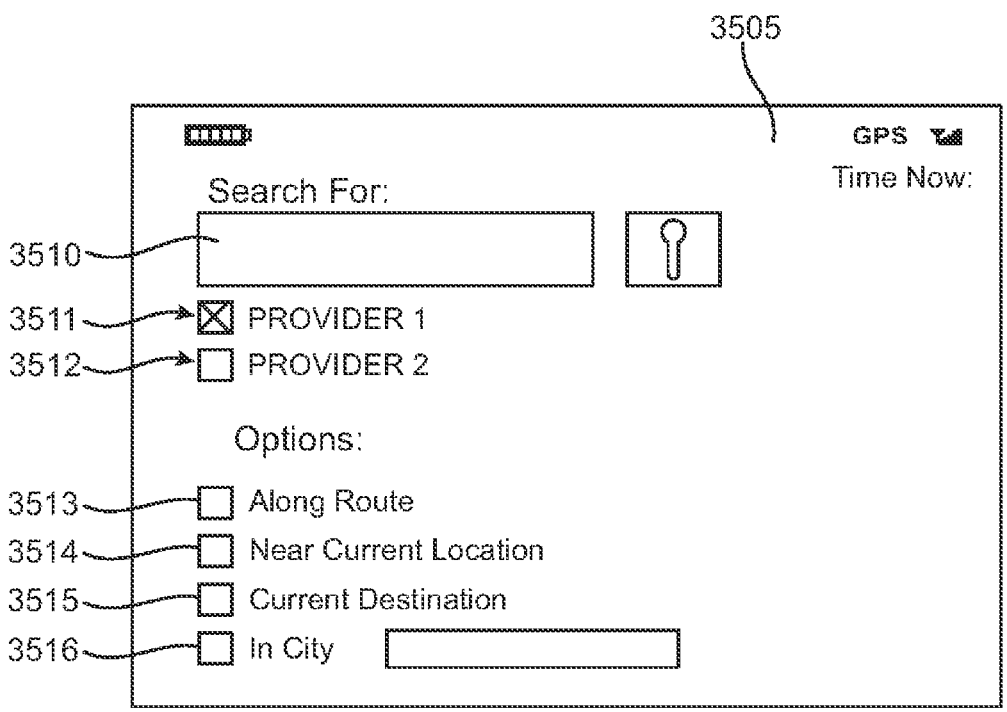
FIG. 18 depicts an example user interface element relating to searching.

Additional to the aspects described above, a user interface can comprise a search interface element, according to an example an interface element 3505 (see FIG. 18). Such interface element 3505 can be arrived at by selection of search 2714. Interface element 3505 can include an area 3510 where one or more search terms can be provided on which a search is to be made; such terms can include informational categories, locations, topics, themes, brands and so on. Different search providers may be enabled on a device having interface element 3505, interface element 3505 may provide options 3511 and 3512 to select among search providers (more options can be provided as desired). Other search options that can be provided on interface element 3505 include an option to search along a current route (3513), an option to search near a current location (3514), an option to search near a destination of the current route (3515), or to search in a particular city (3516), which can be accompanied by a mechanism to accept input of such city.

Search results can be displayed along the linear representations of previous figures, as visual indicators, such as indicators to display weather conditions, and road conditions, as describe above. FIG. 19 depicts a schematic example of a user interface element 3605, which provides search results along a linear representation (spine/trunk) of a route. In particular, the example displays results of a search along route (per discussion with respect to FIG. 18). The search results can be displayed as icons 3615a and 3615b, as well as icons 3820a and 3820b; these icons are depicted schematically as boxes, where each box represents a result of the search, at different physical points along the route. Icons 3615a and 3615b are depicted larger than icons 3820a and 3820b. The larger icons that depict results which are sponsored, or satisfy one or more other distinguishing criteria, such as defined user preferences, can be depicted more prominently than other icons for other search results (represented by icons 3820a and 3820b). Branded icons can be used, preferably for the sponsored search result icons 3615a and 3615b. For example, if searching for gas stations along a route, branded icons for a gas station chain sponsoring that search can be provided, while only generic indicators can be displayed for non-sponsored results. Other examples of criteria that can be used in determining whether to use a distinguishing icon (versus a generic indicator) can include identifying a lowest price, or a more convenient destination. If an OBD connection with an automobile is active, fuel levels can be used in determining prominence of icons. For example, icons for gas stations within range can be emphasized.

Such disclosures are exemplary and other variations can be provided according to these examples. Where detours are indicated, the search can automatically be performed for those suggested detours, and results displayed, according to the above description for the main route. Results of a search also can initiate calculation of a detour, and display of indications of the availability of that detour, and the results of the search which prompted that detour.

FIG. 20 depicts an example method which can be used in producing data for user interface element 3605. The method is described with respect to the above description of the options presented on user interface 3605. The method includes receiving (3703) a selection of a search option from another display (see FIG. 14, for example). Responsively, user interface element 3605 can be displayed (3705). A selection of search terms, options, and other preference information (see FIG. 19) can be received or otherwise accessed (3707). For example, defined user preferences can be stored in device memory and accessed. A search is submitted (3708) to a selected or default search provider. The search can include some or all of the options or other specifications. Results of the search are received (3709); filtering or other processing of the search results can be made. Such filtering may be provided at the device, based on options and preferences selected, but not used in producing the original search results. Icons (see FIG. 19 and discussed thereto), are determined (3713) to represent the search results, and positions of those icons along the spine for the route are determined (3715).

Although the above has been described with reference to certain specific embodiments, various modifications thereof will be apparent to those skilled in the art as outlined in the appended claims.

What is claimed is:

1. A method implemented on a computerized device, comprising:
 representing a non-linear route, comprising a sequence of segments, for traveling from a location to a destination, on a display as a substantially straight linear shape extending between a location end and a destination end;
 attributing a scaling factor between a characteristic of the route and a length of the linear shape with different scaled portions of the linear representation pertaining to the different travel segments of the route; and
 depicting an informational element pertaining to a point along the route relative to a point along the linear shape corresponding, based on the scaling factor, to the informational element.

2. The method of claim 1, further comprising displaying the location end and the destination end of the linear shape at fixed locations on the display.

3. The method of claim 1, further comprising determining the scaling factor based on one of a distance of the route and an estimated travel time.

4. The method of claim 1, further comprising deriving the estimated travel time from a reported travel time for a segment of the route based on traffic updates.

5. The method of claim 1, wherein the information element comprises a segment depicted along a portion of the linear shape, and wherein the information element represents information relevant to the portion of the route represented by that portion of the linear shape.

6. The method of claim 1, wherein the information element is depicted on the display as another linear shape extending parallel to the linear shape.

7. The method of claim 6, wherein a leader line is displayed to connect the point along the linear shape for the information element to the another linear shape.

8. The method of claim 6, wherein the information element is indicative of a potential detour from the route, and the point along the linear shape at which the information element is depicted indicates where the detour can be taken.

9. The method of claim 1, further comprising depicting different traffic congestion conditions along portions of the route using one or more of different coloring and different cross-hatching patterns in portions of the linear shape corresponding to those portions of the route.

10. The method of claim 1, further comprising displaying an indication of a traffic incident, a weather advisory, and a point of interest relative to the linear shape.

11. A non-transitory computer readable medium storing computer executable instructions for a method comprising:
 representing a non-linear route, comprising a sequence of segments, for traveling from a location to a destination, on a display as a substantially straight linear shape extending between a location end and a destination end;
 attributing a scaling factor between a characteristic of the route and a length of the linear shape with different scaled portions of the linear representation pertaining to the different travel segments of the route; and
 depicting an informational element pertaining to a point along the route relative to a point along the linear shape corresponding, based on the scaling factor, to the informational element.

12. The non-transitory computer readable medium of claim 11, wherein the location end and the destination end of the linear shape are displayed at fixed locations on the display.

13. A mobile device, comprising:
 a display capable of displaying 2-D graphics based on inputs indicative of 2-D graphics;
 a navigation module for obtaining a location and a destination, and determining a route comprising a plurality of interconnected travel segments between the location and the destination; and
 a route representation module coupling with the display and the navigation module for outputting to the display a scaled linear representation of the route, with different portions of the linear representation pertaining to different travel segments of the route.

14. The mobile device of claim 13, wherein the route representation module further is for outputting to the display one or more labels relating to respective characteristics of travel segments of the route provided along portions of the linear representation pertaining to such labels.

15. The mobile device of claim 13, wherein the location initially represents an origin of the route and is updated to a current location of the device.

16. The mobile device of claim 13, wherein the route representation module is operable to display ends of the linear representation at fixed locations on the display.

17. The mobile device of claim 13, wherein the route representation module is operable to associate a scale with the linear representation of the route based on a dimension of the display along which the linear representation is displayed and a characteristic of the route.

18. The mobile device of claim 17, wherein the route representation module is operable to use the scale to represent a relationship between length of the linear representation and one of an estimated travel time and a distance remaining to the destination.

19. The mobile device of claim 18, wherein the route representation module is operable to estimate travel time using at least one speed limit on a segment of the route and a corresponding length of such segment.

20. The mobile device of claim 13, wherein the route representation module is further for outputting an information element for display along a portion of the linear representation, which is representative of a selection from the set comprising a traffic congestion condition, a traffic incident, a weather advisory, and a point of interest.

21. The mobile device of claim 13, wherein the route representation module is further for outputting an information element for display along a portion of the linear representation, which is representative of a selection from the set comprising: a detour, a traffic congestion condition, a traffic incident, a weather advisory, and a point of interest.

22. The mobile device of claim 13, wherein the route representation module is further for outputting for display an information element indicating a potential alternate route from a point along the route to the destination.

23. The mobile device of claim 13, wherein the information element is indicative of a potential detour from the route, and the point along the linear shape at which the information element is depicted indicates where the detour can be taken.

24. The mobile device of claim 13, wherein the route representation module is further for depicting different traffic congestion conditions along portions of the route using one or more of different coloring and different cross-hatching patterns in portions of the linear shape corresponding to those portions of the route.

25. The mobile device of claim 13, further comprising displaying an indication of a traffic incident, a weather advisory, and a point of interest relative to the linear shape.

* * * * *